United States Patent
Mallett et al.

(12) 
(10) Patent No.: US 6,292,174 B1
(45) Date of Patent: *Sep. 18, 2001

(54) ENHANCED CURSOR CONTROL USING LIMITED-WORKSPACE FORCE FEEDBACK DEVICES

(75) Inventors: Jeffrey R. Mallett, Boulder Creek; Dean C. Chang, Santa Clara; Louis B. Rosenberg, San Jose; Adam C. Braun, Sunnyvale; Kenneth M. Martin, Palo Alto, all of CA (US); Jonathan L. Beamer, Hanover, NH (US)

(73) Assignee: Immersion Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/565,574

(22) Filed: May 4, 2000

Related U.S. Application Data

(63) Continuation-in-part of application No. 08/924,462, filed on Aug. 23, 1997.
(60) Provisional application No. 60/133,227, filed on May 7, 1999.

(51) Int. Cl.[7] ............................................... G09G 5/08
(52) U.S. Cl. ..................... 345/163; 345/156; 345/157; 345/145
(58) Field of Search ................................ 345/145, 156, 345/157, 161, 163; 463/30, 31, 37

(56) References Cited

U.S. PATENT DOCUMENTS 3,919,691  11/1975  Noll .................................. 340/172.5

(List continued on next page.)

FOREIGN PATENT DOCUMENTS

| 0607580 A1 | 7/1994 | (EP) . |
| 0626634A2 | 11/1994 | (EP) . |
| 875819A1 | 4/1998 | (EP) . |
| WO9520788 | 8/1995 | (WO) . |
| WO9532459 | 11/1995 | (WO) . |
| WO9721160 | 6/1997 | (WO) . |
| WO9731333 | 8/1997 | (WO) . |

OTHER PUBLICATIONS

B. Hannaford et al., "Force–Feeback Cursor Control," NASA Tech Briefs, vol. 13, No. 11, Item #21, 1989, pp. 1–4.

(List continued on next page.)

*Primary Examiner*—Kent Chang
(74) *Attorney, Agent, or Firm*—James R. Riegel; Guy V. Tucker

(57) ABSTRACT

An interface device and method for providing enhanced cursor control with force feedback. A force feedback interface device includes a manipulandum, such as a mouse, that is moveable in a local workspace. The device is coupled to a host computer that displays a cursor in a graphical environment, such as a GUI, on a display screen. An interior region and a border region in the local workspace is defined. One mapping of device movement to cursor movement is used for the interior region, and a different mapping is used for the border region. Mapping methods include ballistics, absolute, linear, rate control, and variable absolute. Rate control embodiments can be single axis or dual axis. In one embodiment, when the mouse moves from the interior region to the border region, the mapping providing the greater cursor velocity is used to better conserve device workspace in the direction of travel and to decrease any sense of mapping mode change to the user. Other features include an autocentering function for reducing offset between local and host frames.

33 Claims, 7 Drawing Sheets

U.S. PATENT DOCUMENTS

| | | | |
|---|---|---|---|
| 4,148,014 | 4/1979 | Burson | 340/709 |
| 4,398,889 | 8/1983 | Lam et al. | 434/45 |
| 4,477,043 | 10/1984 | Repperger | 244/223 |
| 4,654,648 | 3/1987 | Herrington et al. | 340/710 |
| 4,692,756 | 9/1987 | Clark | 340/709 |
| 4,734,685 | 3/1988 | Watanabe | 340/710 |
| 4,782,327 | 11/1988 | Kley et al. | 340/365 |
| 4,800,721 | 1/1989 | Cemenska et al. | 60/393 |
| 4,823,634 | 4/1989 | Culver | 74/471 |
| 4,839,838 | 6/1989 | LaBiche et al. | 364/709.11 |
| 4,868,549 | 9/1989 | Affinito et al. | 340/710 |
| 4,935,728 | 6/1990 | Kley | 340/709 |
| 5,012,231 | 4/1991 | Felsenstein | 340/709 |
| 5,044,956 | 9/1991 | Behensky | 434/45 |
| 5,065,145 | 11/1991 | Purcell | 340/706 |
| 5,076,517 | 12/1991 | Ferranti et al. | 244/228 |
| 5,086,296 | 2/1992 | Clark | 340/709 |
| 5,095,303 | 3/1992 | Clark et al. | 340/710 |
| 5,107,080 | 4/1992 | Rosen | 200/6 |
| 5,116,180 | 5/1992 | Fung et al. | 414/5 |
| 5,146,566 * | 9/1992 | Hollis, Jr. et al. | 710/73 |
| 5,181,181 | 1/1993 | Glynn | 364/566 |
| 5,184,319 | 2/1993 | Kramer | 254/806 |
| 5,185,561 | 2/1993 | Good et al. | 318/432 |
| 5,186,629 | 2/1993 | Rohen | 434/114 |
| 5,193,963 | 3/1993 | McAffee et al. | 414/5 |
| 5,195,179 | 3/1993 | Tokunaga | 395/161 |
| 5,220,260 | 6/1993 | Schuler | 318/561 |
| 5,223,776 | 6/1993 | Radke et al. | 318/568.1 |
| 5,264,768 | 11/1993 | Gregory et al. | 318/561 |
| 5,264,836 | 11/1993 | Rubin | 345/157 |
| 5,286,203 | 2/1994 | Fuller et al. | 434/45 |
| 5,296,846 | 3/1994 | Ledley | 345/161 |
| 5,296,871 | 3/1994 | Paley | 345/163 |
| 5,298,890 | 3/1994 | Kanamaru et al. | 345/157 |
| 5,313,230 | 5/1994 | Venolia et al. | 345/163 |
| 5,355,148 | 10/1994 | Anderson | 345/166 |
| 5,374,942 | 12/1994 | Gilligan et al. | 345/157 |
| 5,389,865 | 2/1995 | Jacobus et al. | 318/568.11 |
| 5,396,266 | 3/1995 | Brimhall | 345/161 |
| 5,398,044 | 3/1995 | Hill | 345/145 |
| 5,405,152 | 4/1995 | Katanics et al. | 273/438 |
| 5,414,337 | 5/1995 | Schuler | 318/561 |
| 5,436,638 | 7/1995 | Bolas et al. | 345/156 |
| 5,457,479 | 10/1995 | Cheng | 345/163 |
| 5,471,571 | 11/1995 | Smith et al. | 395/137 |
| 5,477,237 | 12/1995 | Parks | 345/156 |
| 5,513,100 | 4/1996 | Parker et al. | 364/167.01 |
| 5,530,455 | 6/1996 | Gillick et al. | 345/163 |
| 5,550,562 | 8/1996 | Aoki et al. | 345/163 |
| 5,565,887 | 10/1996 | McCambridge et al. | 345/145 |
| 5,570,111 | 10/1996 | Barrett et al. | 345/157 |
| 5,576,727 | 11/1996 | Rosenberg et al. | 345/179 |
| 5,589,828 | 12/1996 | Armstrong | 341/20 |
| 5,589,854 | 12/1996 | Tsai | 345/161 |
| 5,596,347 | 1/1997 | Robertson | 345/157 |
| 5,623,582 | 4/1997 | Rosenberg | 395/99 |
| 5,625,576 | 4/1997 | Massie et al. | 364/578 |
| 5,629,594 | 5/1997 | Jacobus et al. | 318/568.11 |
| 5,642,469 | 6/1997 | Hannaford et al. | 395/99 |
| 5,643,087 | 7/1997 | Marcus et al. | 463/38 |
| 5,666,138 | 9/1997 | Culver | 345/161 |
| 5,666,473 | 9/1997 | Wallace | 345/420 |
| 5,691,747 | 11/1997 | Amano | 345/167 |
| 5,691,898 | 11/1997 | Rosenberg et al. | 364/190 |
| 5,694,013 | 12/1997 | Stewart et al. | 318/561 |
| 5,696,532 * | 12/1997 | Caprara | 345/145 |
| 5,696,535 | 12/1997 | Rutledge et al. | 345/156 |
| 5,709,219 * | 1/1998 | Chen et al. | 600/453 |
| 5,714,978 | 2/1998 | Yamanaka et al. | 345/157 |
| 5,721,566 | 2/1998 | Rosenberg et al. | 345/161 |
| 5,734,373 | 3/1998 | Rosenberg et al. | 345/161 |
| 5,736,978 | 4/1998 | Hasser et al. | 345/173 |
| 5,742,278 | 4/1998 | Chen et al. | 345/156 |
| 5,745,715 | 4/1998 | Pickover et al. | 395/348 |
| 5,754,023 * | 5/1998 | Roston et al. | 318/561 |
| 5,757,358 | 5/1998 | Osga | 345/146 |
| 5,760,764 | 6/1998 | Martinelli | 345/160 |
| 5,767,839 | 6/1998 | Rosenberg | 345/161 |
| 5,769,640 | 6/1998 | Jacobus et al. | 434/262 |
| 5,771,037 | 6/1998 | Jackson | 345/157 |
| 5,781,172 * | 7/1998 | Engel et al. | 345/164 |
| 5,784,052 | 7/1998 | Keyson | 345/167 |
| 5,790,108 * | 8/1998 | Salcudean et al. | 345/184 |
| 5,802,353 | 9/1998 | Avila et al. | 395/500 |
| 5,805,140 | 9/1998 | Rosenberg et al. | 345/161 |
| 5,805,165 | 9/1998 | Thorne, III et al. | 345/348 |
| 5,808,601 | 9/1998 | Leah et al. | 345/145 |
| 5,808,603 | 9/1998 | Chen et al. | 456/157 |
| 5,825,308 * | 10/1998 | Rosenberg | 341/20 |
| 5,844,392 | 12/1998 | Peruach et al. | 318/568.17 |
| 5,877,748 | 3/1999 | Redlich | 345/163 |
| 5,887,995 | 3/1999 | Holehan | 400/479.1 |
| 5,889,672 * | 3/1999 | Schuler et al. | 364/188 |
| 5,956,016 | 9/1999 | Kuenzner et al. | 345/156 |
| 5,956,484 | 9/1999 | Rosenberg et al. | 395/200.33 |
| 5,959,613 | 9/1999 | Rosenberg et al. | 345/161 |
| 5,973,670 | 10/1999 | Barber et al. | 345/157 |
| 5,973,689 | 10/1999 | Gallery | 345/339 |
| 5,990,869 | 11/1999 | Kubica et al. | 345/163 |
| 6,004,134 | 12/1999 | Marcus et al. | 434/45 |
| 6,020,876 | 2/2000 | Rosenberg et al. | 345/157 |
| 6,028,593 | 2/2000 | Rosenberg et al. | 345/156 |
| 6,046,726 | 4/2000 | Keyson | 345/156 |
| 6,061,004 * | 5/2000 | Rosenberg | 341/20 |
| 6,067,077 * | 5/2000 | Martin et al. | 345/161 |
| 6,078,308 | 6/2000 | Rosenberg et al. | 345/145 |
| 6,084,587 | 7/2000 | Tarr et al. | 345/419 |
| 6,100,874 | 8/2000 | Schena et al. | 345/157 |
| 6,111,577 | 8/2000 | Zilles et al. | 345/355 |
| 6,128,006 | 10/2000 | Rosenberg et al. | 345/163 |
| 6,161,126 | 12/2000 | Wies et al. | 709/203 |
| 6,166,723 | 12/2000 | Schena et al. | 345/184 |

OTHER PUBLICATIONS

L. Rosenberg et al., "Commercially Viable Force Feedback Controller for Individuals w/Neuromotor Disabilities," Wright Patterson AFB, 1996, pp. 1–33.

Payette, Jule et al., "Evaluation of a Force Feedback (Haptic) Computer pointing Device in Zero Gravity," Dymamic Systems & Control Div. DSC–vol. 58, ASME 1996, pp. 547–553.

Colgate, J. Edward et al., "Implementation of Stiff Virtual Walls in Force–Reflecting Interfaces," Northwestern University, 1993, pp. 1–7.

Louis Rosenberg, "Perceptual Design of a Virtual Rigid Surface Contact," Stanford University, Wright Patterson AFB, 1993, pp. 1–40.

Louis Rosenberg et al., "The use of force feedback to enhance graphical user interfaces," Stereoscopic Displays and Virtual Reality Systems III, Proc. SPIE, 1996, pp. 243–248.

Schmidt, Brian et al., "Application Areas for a Force–Feedback Joystick," DSC–vol. 49, Advances in Robotics, Mechatronics, and Haptic Interfaces, ASME 1993, pp. 47–54.

Minsky, Margaret et al., "Feeling and Seeing: Issues in Force Display," University of North Carolina, ACM 1990, pp. 235–242, 270.

Ramstein, Christophe, "Combining Haptic & Braille Technologies: Design Issues and Pilot Study," ASSETS '96, ACM 0-89791-776-6, 1996, pp. 37–44.

Munch, Stefan et al., "Intelligent Control for Haptic Displays," Eurographics '96, vol. 15, No. 3, Blackwell Publishers, 1996, pp. C-218 to C-226.

Wiker, Steven F. et al., "Development of Tactile Mice for Blind Access to Computers," Proc. of the Human Factors Society 35$^{th}$ Annual Meeting, 1991, pp. 708–712.

Akamatsu, Motoyuki et al., "Multimodal Mouse: A Mouse-Type Device with Tactile and Force Display," Presence, vol. 3, No. 1, 1994, pp. 73–80.

Ramstein, Christophe et al., "The Pantograph: A Large Workspace Haptic Device for a Multimodal Human–Computer Interaction," Computer–Human Interaction, CHI '94, 1994, pp. 1–3.

Kelley, A. J. et al., "On the Development of a Force-Feedback Mouse and it's Integration into a Graphical User Interface," 1994 Int'l Mechanical Engineering Congress and Exhibition, 1994, pp. 1–8.

Kelley, A. J. et al., "Magic Mouse: Tactile and Kinesthetic Feedback in the Human–Computer Interface using an Electromagnetically Actuated Input/Output Device," University of British Columbia, 1993, pp. 1–27.

R. E. Ellis et al., "Design & Evaluation of A High-Performance Prototype Planar Haptic Interface," DSC-vol. 49, Advances in Robotics, Mechatronics, and Haptic Interfaces, ASME 1993, pp. 55–64.

H. Iwata, "Artificial Reality with Force–Feedback" Computer Graphics, vol. 24, No. 4, 1990, pp. 165–170.

Adelstein, et al., "Design and Implementation of a Force Reflecting Manipulandum for Manual Control Research" NASA Ames Research, 1992, pp 1–26.

Hayward et al., "Design and Multi–Objective Optimization of a Linkage for a Haptic Interface," Kluwer Academic Publishers, 1994, pp 359–368.

Millman et al., "Design of a Four Degree-of-Freedom Force-Reflecting Manipulandum with a Specified Force/Torque Workspace" 1991, Int'l Conference on Robotics and Automation, pp 1488–1492.

L.A. Jones et al, A Perceptual analysis of stiffness, Experimental Brain Research, 1990, pp. 150–156.

Tan et al., "Human Factors for the Design of Force–Reflecting Haptic Interfaces", ASME WAM '94, 1994, pp. 1–11.

Ouh–young et al., "Using a Manipulator for Force–Display in Molecular Docking", IEEE CH2555-1, 1988,pp 1824–1829.

Kotoku et al, "EMID used in Telerobotic Systems", 1991, IROS '91, pp. 999–1004.

Tan et al., "Manual Resolution of Compliance when Work and Force cues are Minimized" DSC-vol. 49, ASME, 1993, pp. 99–104.

Buttolo et al., "Pen–Based Force Display for Precision Manipulation in Virtual Environments", IEEE 0-8186-7084-3, 1995, pp. 217–224.

Howe et al., "Task Performance with a Dextrous Teleoperated Hand System", vol. 1833, Proc. Of SPIE, 1992, pp. 1–9.

Atkinson et al., "Computing with Feeling", Compu. & Graphics, vol. 2, 1977, pp. 97–103.

Friedman et al., "Perception of Mechanical Properties at the Man–Machine Interface", IEEE CH2503-1, 1987, pp. 688–689.

Russo, "The Design and Implementation of a Three Degree–of–Freedom Force Output Joystick", Dept. of Mech. Eng. , 1990, 33 pgs.

Batter et al., "Grope-1: A Computer Display to the Sense of Feel", IFIP Congress, 1971, pp. 759–763.

Adachi et al., "Sensory Evaluation of Virtual Haptic Push–Buttons", Tech. Res. Cntr., Suuzki Motor Corp, Japan, 1994, 7 pgs.

Hannford et al., "Performance Evaluation of a Six–Axis Generalized Force–Reflecting Teleoperator", IEEE Trans. on Systems, Man, and Cybernetics, 1991, pp. 620–627.

Su et al., "The Virtual Panel Architecture: A 3D Gesture Framework", IEEE 0-7803-1363-1, 1993, 387–393.

Yokokohji et al., "What you can see is wht you can feel–Development of a Visual Haptic Interface to Virtual Environment", IEEE 0-8186-7295-1, 1996, pp. 46–54.

Winey III, "Computer Simulated Visual and Tactile Feedback as an Aid to Manipulator and Vehicle Control", MIT 1981, pp. 2–79.

Kilpatrick, "The Use of a Kinesthetic Supplement in an Interactive Graphics System", University of North Carolina, 1976, pp. 1–175.

Rosenberg, "A Force Feedback Programming Primer", Immersion Corp., 1997, pp. 1–176.

Brooks, Jr. et al., "Haptic Displays for Scientific Visualization", Computer Graphics, vol. 24, No. 4, 1990, pp. 177–185.

Hirota et al., "Development of Surface Display", IEEE 0-7803-1363-1, 1993, pp. 256–262.

Rosenberg, "Virtual Haptic Overlays enhance performance in telepresence tasks", Wright–Patterson AFB, 1994, pgs. 11.

Rosenberg, "Virtual Fixtures as Tools to enhance Operator Performance in Telepresence environments," SPIE Telemanipulator Technology, 1993, pgs. 12.

Rosenberg et al., "Perceptual Decomposition of Virtual Haptic Surfaces", Proc. IEEE Symp. on Research Frontiers in Virtual Reality, 1993, pgs. 8.

Ouh–young, et al., "Creating and Illusion of Feel: Control Issues in Force Display," Computer Science Dept. Univ. of North Carolina, Chapel Hill, Sep. 1989, pp. 1–14.

\* cited by examiner

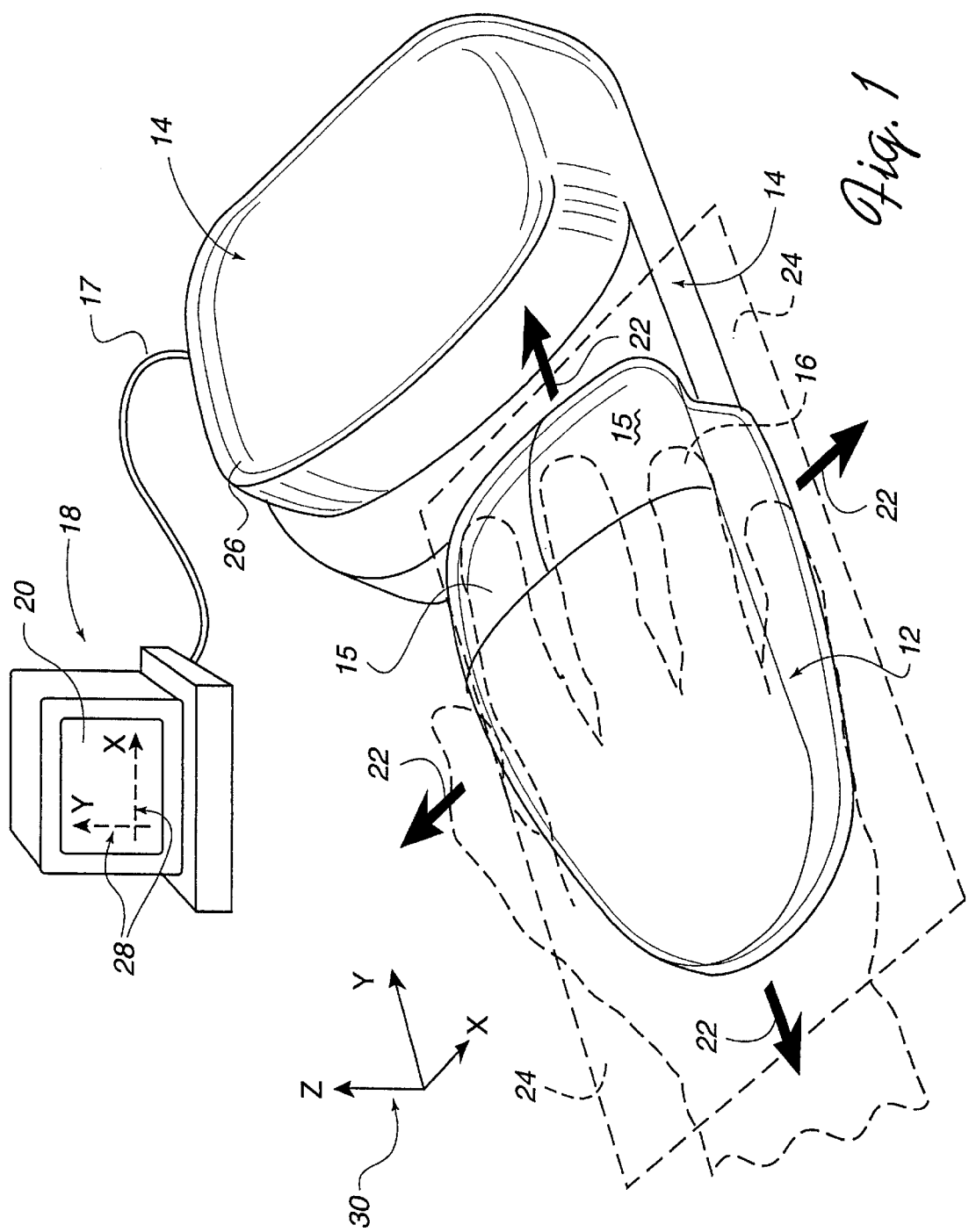

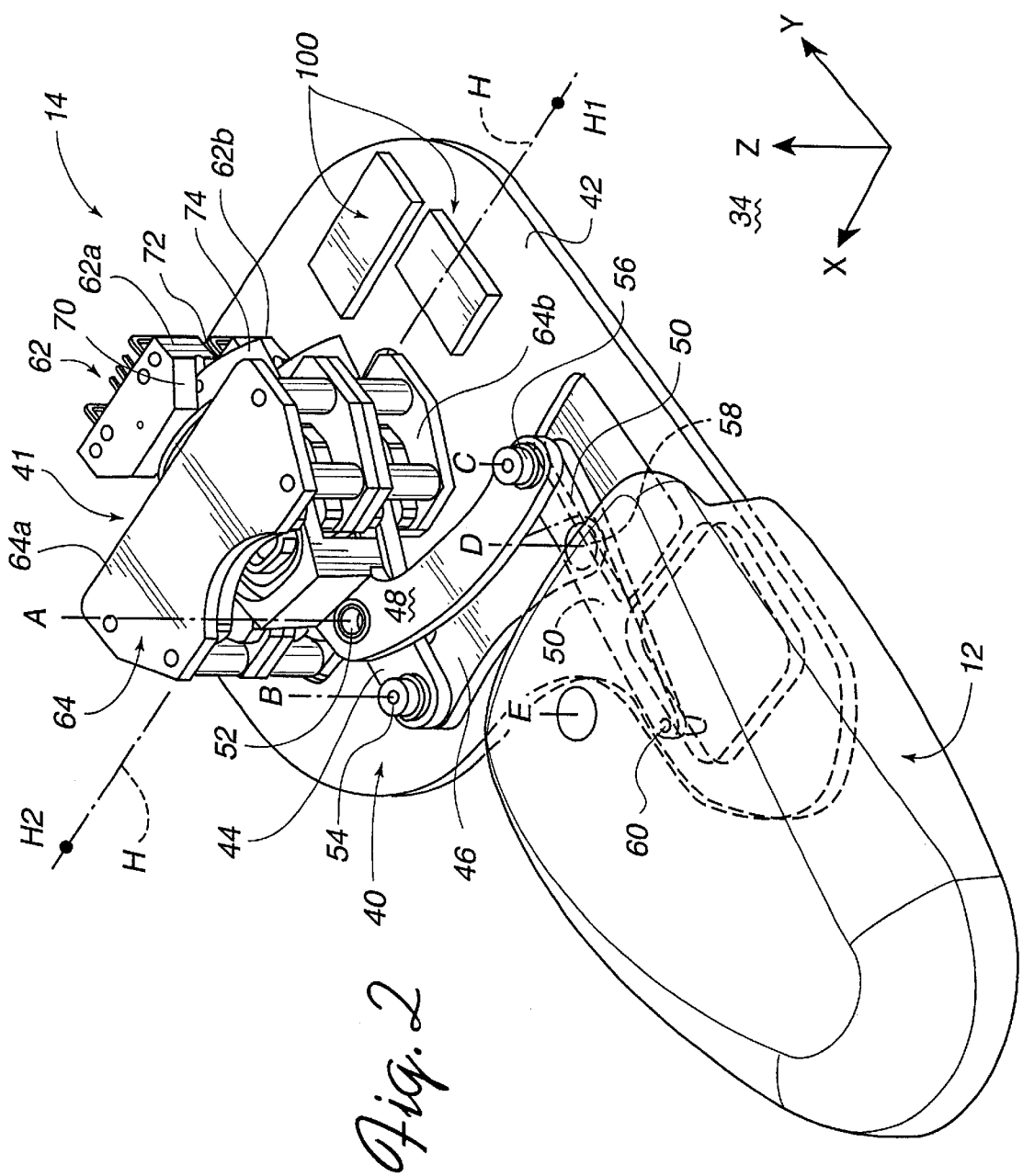

ENHANCED CURSOR CONTROL USING LIMITED-WORKSPACE FORCE FEEDBACK DEVICES

CROSS REFERENCE TO RELATED APPLICATIONS

This application claims priority to U.S. Provisional Application No. 60/133,227, filed May 7, 1999 by Mallett et al.; and this application is a continuation-in-part of co-pending parent U.S. patent application No. 08/924,462, filed Aug. 23, 1997 on behalf of Rosenberg et al., assigned to the assignee of this present application, and both of which are incorporated herein by reference in their entirety.

BACKGROUND OF THE INVENTION

The present invention relates generally to interface devices for allowing humans to interface with computer systems, and more particularly to computer interface devices that allow the user to provide input to computer systems and provide force feedback to the user.

Graphical environments are commonly displayed on computer systems. One visual environment that is particularly common is a graphical user interface (GUI). The user typically moves a displayed, user-controlled graphical object, such as a cursor, across a computer screen and onto other displayed graphical objects or predefined screen regions, and then inputs a command to execute a given selection or operation. The objects or regions ("targets") can include, for example, icons, windows, pull-down menus, buttons, and scroll bars. Most GUI's are currently 2-dimensional as displayed on a computer screen; however, three dimensional (3-D) GUI's that present simulated 3-D environments on a 2-D screen can also be provided. Other programs or environments that may provide user-controlled graphical objects such as a cursor or a "view" controlled by the user include graphical "web pages" or other environments offered on the World Wide Web of the Internet, CAD programs, games, virtual reality simulations, etc.

The user interaction with and manipulation of the computer environment is achieved using any of a variety of types of human-computer interface devices that are connected to the computer system controlling the displayed environment. In most systems, the computer updates the environment in response to the user's manipulation of a user-manipulatable physical object ("user object") that is included in the interface device, such as a mouse, joystick, etc.

A computer mouse is a common user object used to interact with a GUI or other graphical environment. A mouse is typically used as a position control device in which displacement of the mouse in a planar workspace (e.g. on a mouse pad) is directly correlated to displacement of the user-controlled graphical object, such as a cursor, displayed on the screen. This displacement correlation may not be a one-to-one correspondence, since the cursor position may be scaled according to a constant mapping from the mouse position e.g., the mouse may be moved a distance of one inch on a mouse pad which causes the controlled cursor to move four inches across the screen. In most cases, small movements of the mouse are scaled to large motions of the cursor on the screen to allow the user to easily point to targets in all areas of the screen. The user can typically change the scaling or "pointer speed" of a cursor to a desired level, which is the ratio or scaling factor of cursor movement to mouse movement, using menus provided in the operating system or application program.

Force feedback interface devices, such as force feedback mice, allow a user to experience forces on the manipulated user object based on interactions and events within the displayed graphical environment. Typically, computer-controlled motors or other actuators are used to output forces on the user object in provided degrees of freedom to simulate various sensations, such as an obstruction force when moving the cursor into a wall, a damping force to resist motion of the cursor, and a spring force to bias the cursor to move back toward a starting position of the spring.

The scaled cursor movement in a GUI works well for coarse cursor motion, which is the broad, sweeping motion of the cursor that brings the cursor from one global area on the screen to another. Accuracy of cursor motion is not critical for coarse motion, but speed of the cursor is. For such tasks, it is valuable for the cursor to move a large distance with small motions of the physical mouse. However, a problem occurs when the user wishes to move the cursor a short distance or in small increments ("fine positioning"). For tasks in which accurate positioning of the cursor is needed, such as target acquisition tasks, the large scaling of mouse movement to cursor movement is inadequate or even harmful. Certain target acquisition tasks where the targets are very small can be particularly challenging even if the mapping between the cursor and the mouse is reasonable for most other cursor motion activities. For such situations, a scaling that causes large motions of the cursor for small motions of the mouse may make a target acquisition task physically impossible for the user.

Mouse "ballistics" or "ballistic tracking" is typically used to alleviate the scaling problem for fine positioning of the cursor. Ballistics refers to the technique of varying the scaling between motion of a physical mouse and motion of a displayed cursor depending upon the velocity of the mouse in its workspace. The assumption is that if the user is moving the mouse very quickly, the user is likely performing a "coarse motion" task on the screen, and therefore the mouse driver scales small motions of the mouse to large motions of the cursor. Conversely, if the user is moving the mouse very slowly, the user is likely performing a fine positioning task on the screen, and the mouse driver scales small motions of the mouse to small motions of the cursor. Such a variable scaling technique is disclosed in U.S. Pat. No. 4,734,685 of Watanabe and U.S. Pat. No. 5,195,179 of Tokunaga.

Many algorithms can be used for mouse ballistics. The simplest method is to designate a threshold velocity such that if the mouse is moving faster than the threshold velocity, a large scaling of cursor position is made so that small motions of the mouse cause large motions of the cursor; and if the mouse is moving slower than the threshold velocity, a smaller scaling is made so that small motions of the mouse cause small motions of the cursor. A more sophisticated and more common method is to gradually change the scaling in accordance with mouse velocity using several velocity thresholds or a continuous (linear or nonlinear) function. The "mapping" of the cursor to the mouse is the method of translating the mouse position in its workspace to a cursor position on the display screen and may involve ballistics or other algorithms and scale factors.

Mouse ballistics and other mappings may cause difficulty in certain fixed-workspace force feedback mouse implementations. Using ballistics, moving the mouse in one direction quickly and then moving it back in the other direction slowly may create a situation where the physical mouse has returned to its starting position but the cursor is positioned far away from its starting position. This illustrates that the frame of the cursor and the frame of the mouse have shifted or become offset. If this offset becomes too large, the user may not be able to reach some parts of the screen within the range of motion of the mouse. In a typical, open-workspace mouse, the offset is corrected through a process called "indexing." Indexing is achieved in a typical mouse by lifting the mouse off the table and repositioning it after the mouse has hit a limit, while the cursor remains fixed in position. This reduces the offset between the mouse and the cursor frames to a smaller, more comfortable offset. However, some types of force feedback mice may have a fixed, limited workspace due to cost and technological constraints and may not be able to be lifted off the table and repositioned. In addition, the mouse hitting a physical limit to its workspace is disconcerting for a user expecting realistic force feedback. Thus, traditional indexing (or its equivalent) may not be practical. However, since ballistics needs indexing to restore the frame offsets, and since ballistics and indexing are both traditional mouse techniques that conflict with typical force feedback functionality, a solution is needed that reconciles both the ballistics and the indexing problem in force feedback interface devices.

SUMMARY OF THE INVENTION

The present invention is directed to a force feedback interface which allows enhanced cursor control using fixed-workspace force feedback devices. Various embodiments are presented which compensate for any problems caused by offsets in mouse and cursor movement frames.

An interface device and method for providing enhanced cursor control with force feedback is described. A force feedback interface device includes a manipulandum, such as a mouse, that is moveable in a local, fixed workspace. The device is coupled to a host computer that displays a cursor in a graphical environment, such as a GUI, on a display screen. An interior region and a border region in the local workspace is defined. One mapping of device movement to cursor movement is used for the interior region, and a different mapping is used for the border region. Mapping methods include ballistics, absolute, linear, rate control, and variable absolute methods. The rate control methods can be used for a single axis or for two axes.

In one embodiment, when the mouse moves from the interior region to the border region, the mapping providing the greater cursor velocity is used to decrease any sense of mapping mode change to the user. In a different embodiment, the force feedback device performs auto-centering of the manipulandum in its workspace using the actuators of the device to decrease an offset between the local frame and the screen frame.

The methods and apparatus of the present invention advantageously provides enhanced control over a cursor in a graphical environment for a kinesthetic force feedback mouse with a limited workspace, while not compromising the fidelity or expected feel of force feedback sensations based on motion of the mouse or other user object. The indexing features of the present invention allow the user to control the cursor even when a large offset exists between the mouse and cursor positions in their respective frames, allows the user to reduce this offset, and substantially reduces the user's undesired experience of any hard, physical stops when the mouse reaches a physical limit in its workspace.

These and other advantages of the present invention will become apparent to those skilled in the art upon a reading of the following specification of the invention and a study of the several figures of the drawing.

BRIEF DESCRIPTION OF THE DRAWINGS

FIG. 1 is a perspective view of a force feedback mouse embodiment suitable for use with the present invention;

FIG. 2 is a perspective view of a mechanical system for use with the interface device of FIG. 1;

DETAILED DESCRIPTION OF PREFERRED EMBODIMENTS

Figure 3A:
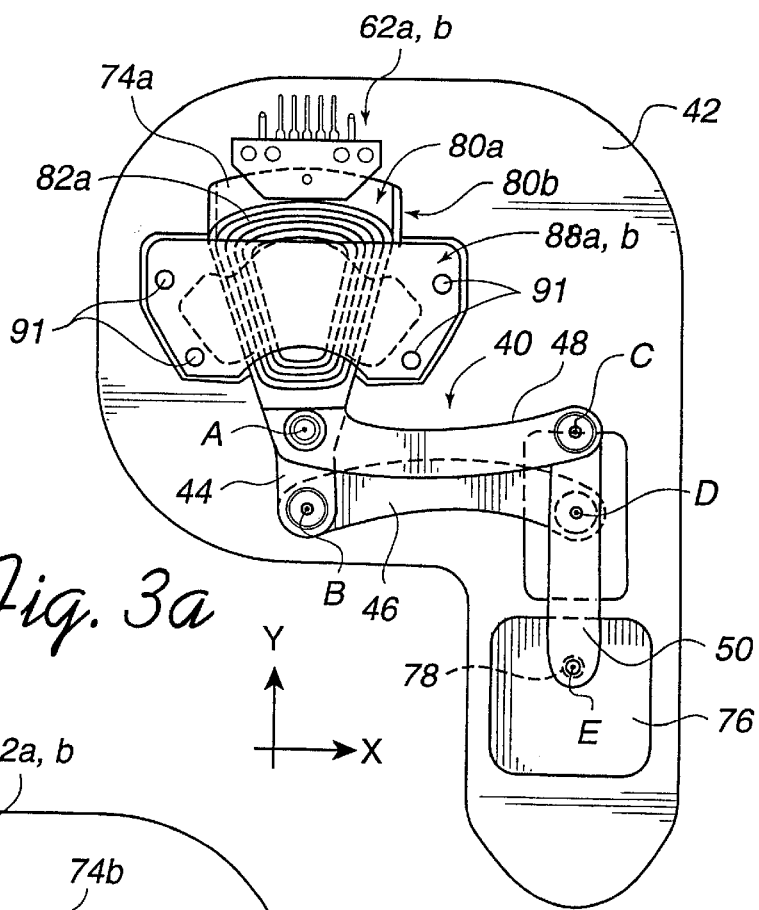
FIGS. 3a and 3b are top plan views of the mechanical system of FIG. 2 showing the limits to motion of the mouse.

FIG. 1 is a perspective view of a force feedback mouse interface system 10 of the present invention capable of providing input to a host computer based on the user's manipulation of the mouse and capable of providing force feedback to the user of the mouse system based on events occurring in a program implemented by the host computer. Mouse system 10 includes a mouse or "puck" 12, an interface 14, and a host computer 18. It should be noted that the term "mouse" as used herein, indicates an object 12 generally shaped to be grasped or contacted from above and moved within a substantially planar workspace (and additional degrees of freedom if available). Typically, a mouse is a smooth or angular shaped compact unit that snugly fits under a user's hand, fingers, and/or palm, but may be shaped otherwise in other embodiments.

Mouse 12 is an object that is preferably grasped or gripped and manipulated by a user. By "grasp," it is meant that users may releasably engage a portion of the object in some fashion, such as by hand, with their fingertips, etc.; an example of a user's hand is shown as dashed line 16. In addition, mouse 12 preferably includes one or more buttons 15 to allow the user to provide additional commands to the computer system. It will be appreciated that a great number of other types of user manipulable objects ("user objects" or "physical objects") and mechanisms suitable therefor can be used, such as a sphere (e.g. a track ball), a puck, a joystick, cubical- or other-shaped hand grips, a receptacle for receiving a finger or a stylus, a flat planar surface like a plastic card having a rubberized, contoured, and/or bumpy surface, or other objects.

Interface 14 interfaces mechanical and electrical input and output between the mouse 12 and host computer 18 implementing the application program, such as a GUI, simulation or game environment. Interface 14 provides multiple degrees of freedom to mouse 12; in the preferred embodiment, two planar degrees of freedom are provided to the mouse, as shown by arrows 22. In other embodiments, greater or fewer degrees of freedom can be provided, as well as rotary degrees of freedom. For many applications, mouse 12 need only be moved in a very small workspace area, shown as dashed line 24 in FIG. 1 as an example. In a preferred embodiment, the user manipulates mouse 12 in a planar workspace and the position of mouse 12 is translated into a form suitable for interpretation by position sensors of the interface 14.

The mouse 12 and interface 14 preferably provide kinesthetic forces to the mouse 12 and thus to the user grasping or otherwise contacting the mouse. That is, forces are provided on the user manipulatable object in the planar degrees of freedom of the mouse, such as resistance to motion, jolts, textures, etc. In the preferred embodiment, the mouse 12 has a limited workspace and will hit the hard limits when moved to the workspace extremes. The limited workspace is due to a mechanical linkage providing the forces on the mouse, as described below with respect to FIG. 2.

The electronic portion of interface 14 may couple the mechanical portion of the interface to the host computer 18. The electronic portion is preferably included within the housing 26 of the interface 14 or, alternatively, the electronic portion may be included in host computer 18 or as a separate unit with its own housing. A suitable embodiment of the electrical portion of interface 14 is described in detail with reference to FIG. 4.

The interface 14 can be coupled to the computer 18 by a bus 17, which communicates signals between interface 14 and computer 18 and also, in the preferred embodiment, provides power to the interface 14 (e.g. when bus 17 includes a USB interface). In other embodiments, signals can be sent between interface 14 and computer 18 by wireless transmission/reception.

Host computer 18 is preferably a personal computer or workstation, such as an IBM-PC compatible computer or Macintosh personal computer, or a SUN or Silicon Graphics workstation. For example, the computer 18 can operate under the Windows™ or MS-DOS operating system in conformance with an IBM PC AT standard. Alternatively, host computer system 18 can be one of a variety of home video game systems commonly connected to a television set, such as systems available from Nintendo, Sega, or Sony. In other embodiments, home computer system 18 can be a "set top box" which can be used, for example, to provide interactive television functions to users, or a "network-" or "Internet-computer" which allows users to interact with a local or global network using standard connections and protocols such as used for the Internet and World Wide Web. Host computer preferably includes a host microprocessor, random access memory (RAM), read only memory (ROM), input/output (I/O) circuitry, and other components of computers well-known to those skilled in the art.

Host computer 18 preferably implements a host application program with which a user is interacting via mouse 12 and other peripherals, if appropriate, and which can include force feedback functionality. For example, the host application program can be a simulation, video game, Web page or browser that implements HTML, VRML, or other instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Unix, etc. are also referred to as "application programs." In one preferred embodiment, an application program utilizes a graphical user interface (GUI) to present options to a user and receive input from the user. Herein, computer 18 may be referred as displaying "graphical objects" or "computer objects." These objects are not physical objects, but are logical software unit collections of data and/or procedures that may be displayed as images by computer 18 on display screen 20, as is well known to those skilled in the art. Display device 20 can be included in host computer 18 and can be a standard display screen (LCD, CRT, etc.), 3-D goggles, or any other visual output device.

There are two primary "control paradigms" of operation for mouse system 10: position control and rate control.

Position control is the more typical control paradigm for mouse and similar controllers, and refers to a mapping of mouse 12 in which displacement of the mouse in physical space directly dictates displacement of a graphical object. The mapping can have an arbitrary scale factor, but the fundamental relation between mouse displacements and graphical object displacements should be present. Under a position control mapping, the computer object does not move unless the user object is in motion. Position control is a popular mapping for applications such as graphical user interfaces (GUI's) or medical procedure simulations. Position control force feedback roughly corresponds to forces which would be perceived directly by the user, i.e., they are "user-centric" forces.

As shown in FIG. 1, a "display frame" 28 is provided with the display screen 20 for defining the area of movement of a cursor in graphical environment. This frame can also be considered a "host frame", although the interface 14 may reference it as well. In contrast, the mouse 12 has a "local frame" 30 allowed by the workspace in which the mouse 12 is moved. In a position control paradigm, the position (or change in position) of a user-controlled graphical object, such as a cursor, in display frame 30 corresponds to a position (or change in position) of the mouse 12 in the local frame 28.

Rate control is also used as a control paradigm. This refers to a mapping in which the displacement of the mouse 12 along one or more provided degrees of freedom is abstractly mapped to motion of a computer-simulated object under control. There is not a direct physical mapping between physical object (mouse) motion and computer object motion. Thus, most rate control paradigms allow the user object can be held steady at a given position but the controlled computer object is in motion at a commanded or given velocity, in contrast to the position control paradigm that only allows the controlled computer object to be in motion if the user object is in motion.

The mouse interface system 10 is useful for both position control ("isotonic") tasks and rate control ("isometric") tasks. For example, as a traditional mouse, the position of mouse 12 in the workspace 24 can be directly mapped to a position of a cursor on display screen 20 in a position control paradigm. Alternatively, the displacement of mouse 12 in a particular direction against an opposing output force can command rate control tasks in an isometric mode, as described with reference to the indexing feature of FIG. 13. Another implementation that provides both isotonic and isometric functionality for a force feedback controller and which is suitable for the interface device of the present invention is described in U.S. Pat. No. 5,825,308, incorporated by reference herein.

FIG. 2 is a perspective view of an example embodiment of mouse system 10 with the cover portion of housing 26 removed, showing the mechanical portion of interface 14 for providing mechanical input and output in accordance with the present invention. A similar suitable mouse device 10 for use with the present invention is described in greater detail in co-pending patent applications Ser. No. 08/881,691, filed Jun. 24, 1997, incorporated by reference herein in its entirety.

Interface 14 includes a mouse or other user manipulatable object 12, a mechanical linkage 40, and a transducer system 41. A base 42 is provided to support the mechanical linkage 40 and transducer system 41 on grounded surface 34. Mechanical linkage 40 provides support for mouse 12 and couples the mouse to a grounded surface 34, such as a tabletop or other support. Linkage 40 is, in the described embodiment, a 5-member (or "5-bar") linkage including a ground member 42, a first base member 44 coupled to ground member 42, a second base member 48 coupled to ground member 42, a link member 46 coupled to base member 44, and an object member 50 coupled to link member 46, base member 48 and to mouse 12.

Ground member 42 is coupled to or resting on a ground surface 34. The members of linkage 40 are rotatably coupled to one another through the use of rotatable pivots or bearing assemblies ("bearings") having one or more bearings. Base member 44 is rotatably coupled to ground member 42 by a grounded bearing 52 and can rotate about an axis A. Link member 46 is rotatably coupled to base member 44 by bearing 54 and can rotate about a floating axis B, and base member 48 is rotatably coupled to ground member 42 by bearing 52 and can rotate about axis A. Object member 50 is rotatably coupled to base member 48 by bearing 56 and can rotate about floating axis C, and object member 50 is also rotatably coupled to link member 46 by bearing 58 such that object member 50 and link member 46 may rotate relative to each other about floating axis D. Mouse 12 can be moved within a planar workspace defined by the x-y plane, which is defined by the x- and y-axes as shown in FIG. 2. Mouse 12 in the preferred embodiment is coupled to object member 50 by a rotary bearing 60 so that the mouse may rotate about floating axis E and allow the user some flexible movement in the planar workspace.

Transducer system 41 is used to sense the position of mouse 12 in its workspace and to generate forces on the mouse 12. Transducer system 41 preferably includes sensors 62 and actuators 64. The sensors 62 collectively sense the movement of the mouse 12 in the provided degrees of freedom and send appropriate signals to the electronic portion of interface 14. Sensors 62, in the described embodiment, include a grounded emitter portion 70 emits a beam which is detected across a gap by a grounded detector 72. A moving encoder disk or arc 74 is provided at the end of member 48 which blocks the beam in predetermined spatial increments. In other embodiments, other types of sensors may be preferred, depending on the desired cost of the device. For example, instead of providing an arc 74 at the end of member 48, a number of gear teeth can be provided, which engage a cylindrical gear that is rigidly coupled to an encoder wheel that passes through an emitter-detector pair as is well-known to those skilled in the art. Such a sensor embodiment may provide higher sensing resolution at a lower cost, but may suffer from gear slip and less accurate sensing after extended use of the device.

Transducer system 41 also preferably includes actuators 64 to transmit forces to mouse 12 in space, i.e., in two (or more) degrees of freedom of the user object. The housing of a grounded portion of actuator 64b is rigidly coupled to ground member 42 and a moving portion of actuator 64b (e.g., a coil) is integrated into the base member 44. The actuator transmits rotational forces to base member 44 about axis A. The housing of the grounded portion of actuator 64a is rigidly coupled to ground member 42 through the grounded housing of actuator 64b, and a moving portion (such as a wire coil) of actuator 64a is integrated into base member 48. Actuator 64a transmits rotational forces to link member 48 about axis A. The combination of these rotational forces about axis A allows forces to be transmitted to mouse 12 in all directions in the planar workspace provided by linkage 40. In the preferred embodiment, actuators 64 are electromagnetic voice coil actuators which provide force through the interaction of a current in a magnetic field.

Another embodiment of a force feedback mouse mechanism, similar to the described mechanism, is disclosed in U.S. application Ser. No. 08/965,720, filed Nov. 7, 1997, and incorporated herein by reference. That embodiment includes actuators that are not stacked but are both separately connected to ground at two different places, and may be more appropriate for some embodiments requiring a flatter profile for the device. In other interface device embodiments, other types of mechanisms can be used, such as well-known force feedback mechanisms used for joysticks, trackballs, etc.

As shown in FIG. 3a, a workspace guide opening 76 is provided in ground member 42 to limit the movement of mouse 12 in the x-y plane and thus defines the limited physical workspace of the mouse 12. Guide opening 76 is a shallow opening in the ground member 42 having sides which block movement of the mouse 12 beyond specified limits. A guide pin 78 is coupled to the bearing 60 at axis E and extends down into the guide opening 76. Pin 78 contacts one or more sides of the opening 76 when the mouse is moved to a limit in a particular direction.

Figure 3B:
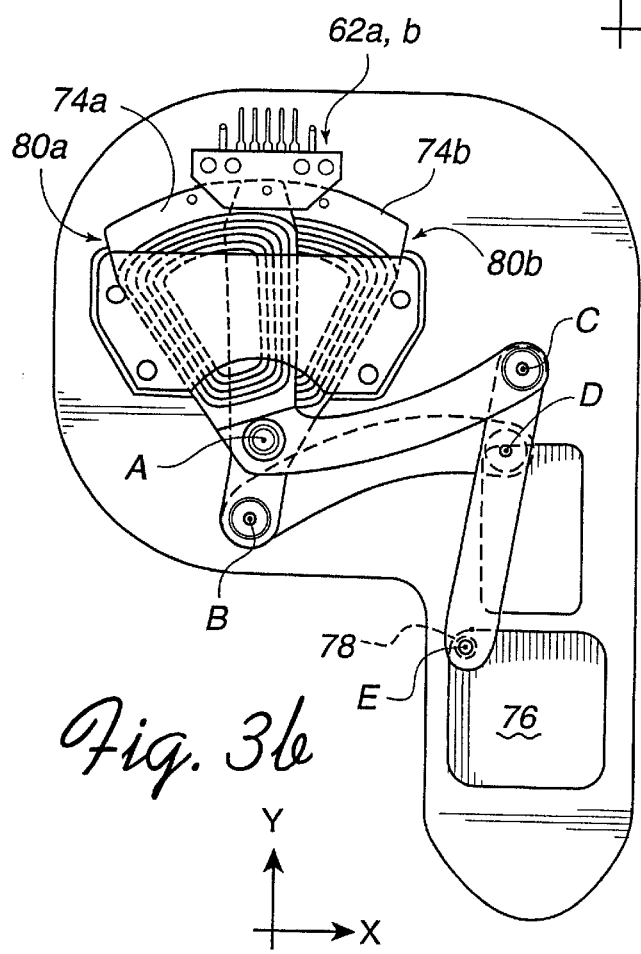

As shown, guide opening 76 has relatively small dimensions, allowing the mouse a workspace of approximately 0.9" by 0.9" in the described embodiment; greater or smaller workspaces can be provided in alternate embodiments, and/or other types of stops or guides can be used to prevent movement past predetermined limits. FIG. 3a shows guide pin 78 approximately in the center of the guide opening 76. In FIG. 3b, the mouse 12 (not shown) and axis E have been moved in the x-y plane of the workspace of the mouse. The movement of the mouse has been limited by the guide opening 76, where guide pin 78 has engaged the sidewall of the upper-left corner area of guide opening 76 and stops any further movement in the forward y-direction.

Figure 4:
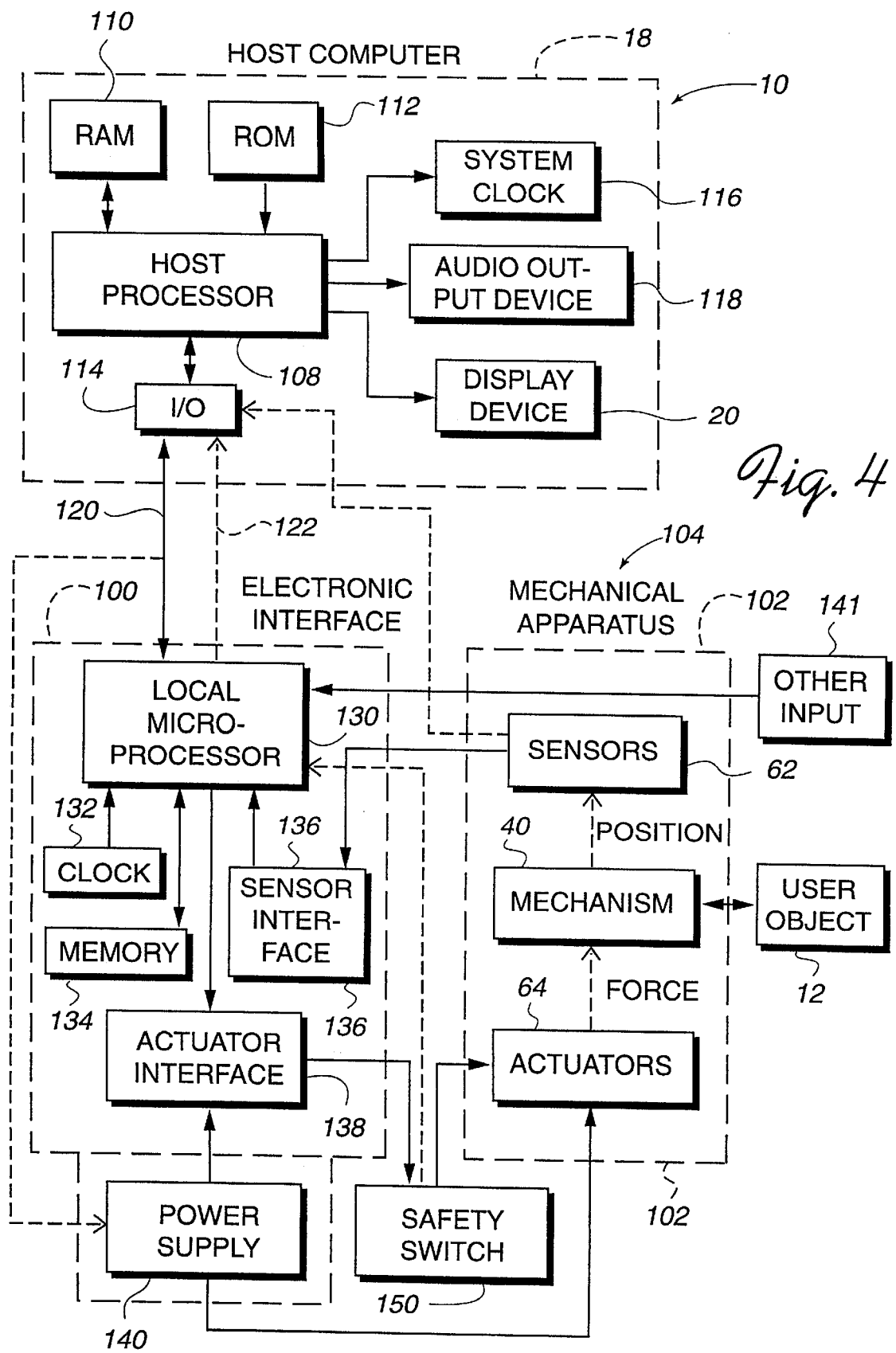
FIG. 4 is a block diagram illustrating the interface device and host computer suitable for use with the present invention.

FIG. 4 is a block diagram illustrating the electronic portion of interface 14 and host computer 18 suitable for use with the present invention. Mouse interface system 10 includes a host computer 18, electronic interface 100, mechanical apparatus 102, and mouse or other user object 12. Electronic interface 100, mechanical apparatus 102, and mouse 12 can also collectively be considered a "force feedback interface device" 104 that is coupled to the host computer. A similar system is described in detail in U.S. Pat. No. 5,734,373, which is hereby incorporated by reference herein.

As explained with reference to FIG. 1, computer 18 is preferably a personal computer, workstation, video game console, or other computing or display device. Host computer system 18 commonly includes a host microprocessor 108, random access memory (RAM) 110, read-only memory (ROM) 112, input/output (I/O) electronics 114, a clock 116, a display device 20, and an audio output device 118. Clock 116 is a standard clock crystal or equivalent component used by host computer 18 to provide timing to electrical signals used by host microprocessor 108 and other components of the computer system 18. Display device 20 is described with reference to FIG. 1. Audio output device 118, such as speakers, can be coupled to host microprocessor 108 via amplifiers, filters, and other circuitry well known to those skilled in the art. Other types of peripherals can also be coupled to host processor 108, such as storage devices (hard disk drive, CD ROM drive, floppy disk drive, etc.), printers, and other input and output devices.

Electronic interface 100 is coupled to host computer system 18 by a bi-directional bus 120. The bi-directional bus sends signals in either direction between host computer system 18 and the interface device 104. Bus 120 can be a serial interface bus providing data according to a serial communication protocol, a parallel bus using a parallel protocol, or other types of buses (e.g., a Universal Serial Bus (USB)).

Electronic interface 100 includes a local microprocessor 130, local clock 132, local memory 134, sensor interface 136, and actuator interface 138. Local microprocessor 130 preferably coupled to bus 120 and is considered "local" to interface device 104, where "local" herein refers to processor 130 being a separate microprocessor from any processors 108 in host computer 18. Microprocessor 130 can be provided with software instructions to wait for commands or requests from computer host 18, parse/decode the command or request, and handle/control input and output signals according to the command or request. In addition, processor 130 preferably operates independently of host computer 18 by reading sensor signals and calculating appropriate forces from those sensor signals, time signals, and force processes selected in accordance with a host command, and output appropriate control signals to the actuators. Such functionality is described in greater detail in copending patent application Ser. No. 09/924,462 and U.S. Pat. No. 5,734,373, both incorporated herein by reference. Force feedback used in graphical environments is described in greater detail in co-pending patent application Ser. Nos. 08/571,606 and 08/756,745, which are incorporated herein by reference.

A local clock 132 can be coupled to the microprocessor 130 to provide timing data, similar to system clock 116 of host computer 18; the timing data might be required, for example, to compute forces output by actuators 64 (e.g., forces dependent on calculated velocities or other time dependent factors). Local memory 134, such as RAM and/or ROM, is preferably coupled to microprocessor 130 in interface 100 to store instructions for microprocessor 130 and store temporary and other data.

Sensor interface 136 may optionally be included in electronic interface 100 convert sensor signals to signals that can be interpreted by the microprocessor 130 and/or host computer system 18. Actuator interface 138 can be optionally connected between the actuators 64 and microprocessor 130 to convert signals from microprocessor 130 into signals appropriate to drive the actuators. Power can be supplied to the actuators 64 and any other components (as required) by the USB, or by a dedicated power supply 140.

Mechanical apparatus 102 is coupled to electronic interface 100 preferably includes sensors 62, actuators 64, and linkage 40. Sensors 62 sense the position, motion, and/or other characteristics of mouse 12 along one or more degrees of freedom and provide signals to microprocessor 130 including information representative of those characteristics. Example of sensors suitable for embodiments described herein are rotary or linear optical encoders, potentiometers, non-contact sensors (e.g., Hall effect magnetic sensors, optical sensors, lateral effect photo diodes), velocity sensors (e.g., tachometers), or acceleration sensors (e.g., accelerometers). Furthermore, either relative or absolute sensors can be employed.

Actuators 64 transmit forces to mouse 12 in one or more directions along one or more degrees of freedom in response to signals output by microprocessor 130 and/or host computer 18, i.e., they are "computer controlled." Actuators 64 can include two types: active actuators and passive actuators. Active actuators include linear current control motors, stepper motors, pneumatic/hydraulic active actuators, a torquer (motor with limited angular range), a voice coil actuator, and other types of actuators that transmit a force to an object. Passive actuators can also be used for actuators 64, such as magnetic particle brakes, friction brakes, pneumatic/hydraulic passive actuators, or passive damper elements and generate a damping resistance or friction in a degree of motion.

Mechanism 40 is preferably the five-member linkage 40 described above, but can also be one of several types of mechanisms. Other input devices 141 can optionally be included in system 10 and send input signals to microprocessor 130 and/or host computer 18. Such input devices can include buttons, such as buttons 15 on mouse 12, used to supplement the input from the user to a GUI, game, simulation, etc. Also, dials, switches, sensors, voice recognition hardware (with software implemented by host 18), or other input mechanisms can be used.

Safety or "deadman" switch 150 can be included in interface device 104 to provide a mechanism to allow a user to override and deactivate actuators 64, or require a user to activate actuators 64, for safety reasons. Safety switch 150 is coupled to actuators 64 such that the user must continually activate or close safety switch 150 during manipulation of mouse 12 to activate the actuators 64.

Enhanced Cursor Control and Force Feedback

An aspect of the present invention is to allow control over the cursor without allowing limits to physical movement of the mouse (or other object) to become intrusive to the user. In some embodiments, the limits are made less intrusive through the use of suitable mapping methods between mouse and cursor. The limits can be made less intrusive through the use of "indexing" features that correspond to the case in a traditional unconstrained (open workspace) mouse of the user repositioning the mouse in its workspace to reduce the offset between the mouse frame and the host computer frame. There are several different embodiments described herein that include these features. Although the term "mouse" is used in the following embodiments, it is intended that other types of interface devices and user manipulatable objects may also be used with the present invention, such as joysticks, finger wheels or dials, spheres, etc. In addition, the various embodiments presented below are described for use with the preferred local microprocessor 130 (or other dedicated processing circuitry on the interface device 104); however, a host computer 18 can implement the embodiments of the present invention (with any appropriate modifications) if no local microprocessor is present in a particular hardware embodiment. Alternatively, the host computer can implement some functions (such as ballistics calculations and indexing calculations) while the local microprocessor implements other functions. It is assumed in the methods below that host computer 18 is displaying a graphical environment such as a GUI, game, virtual reality simulation, etc. on display device 20. It should also be noted that many of the below mapping methods can also be used in non-force feedback interface devices which may have physical limits to the workspace of the manipulandum.

The methods described below may be implemented with program instructions or code stored on or transferred through a computer readable medium. Such a computer readable medium may be digital memory chips or other memory devices; magnetic media such as hard disk, floppy disk, or tape; or other media such as CD-ROM, DVD, PCMCIA cards, etc. The computer readable medium may be included in the interface device 14, in host computer 18, or in both. The program instructions may also be transmitted through a channel to interface device 14 from a different source.

Methods for performing some of the cursor control embodiments described below are also described in detail in copending patent application Ser. No. 08/924,462, filed Aug. 23, 1997, entitled, "Mouse Interface Device and Method for Providing Enhanced Cursor Control and Indexed Cursor Control with Force Feedback," which is incorporated herein by reference.

Figure 5:
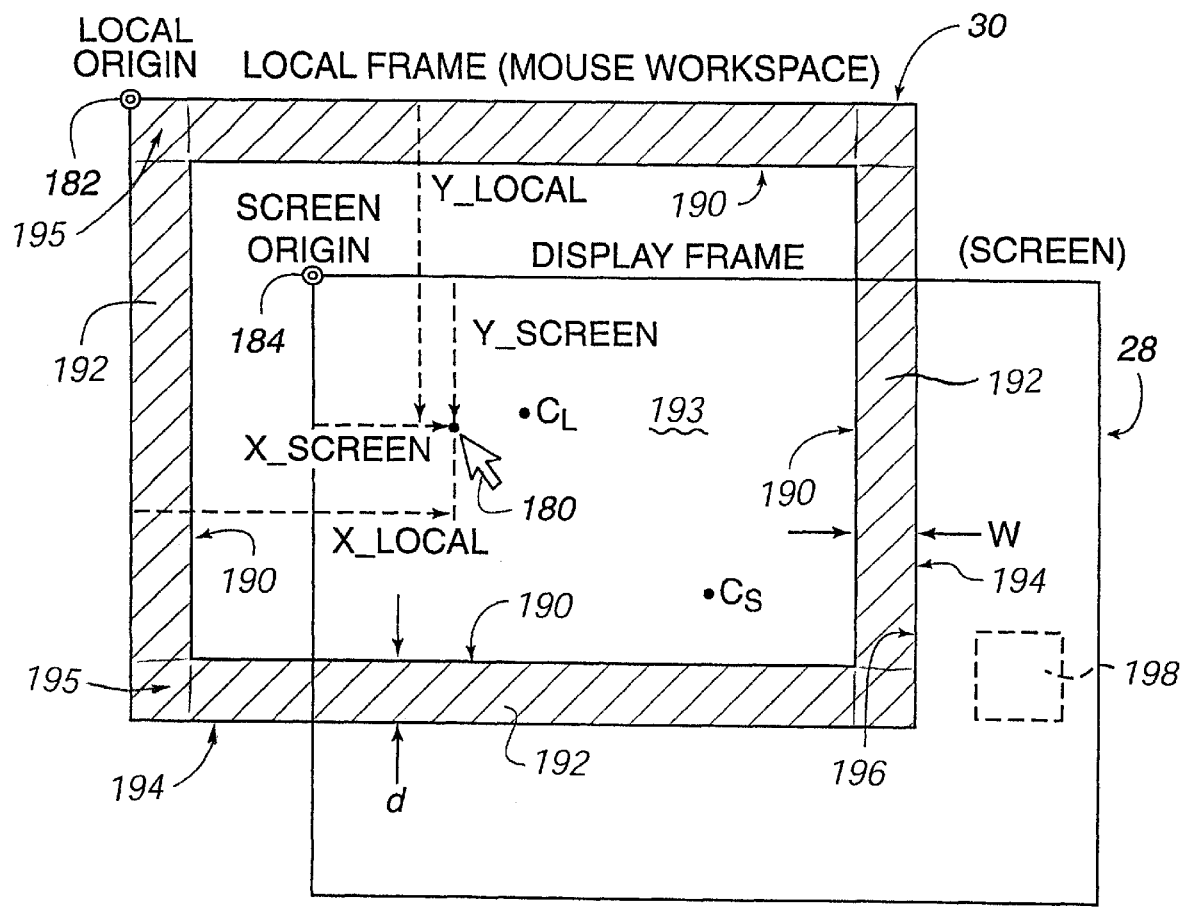
FIG. 5 is a diagrammatic illustration of the screen frame and device frame of the mouse device.

FIG. 5 is a diagrammatic illustration of the local frame 30 and display frame 28 and their relationship. The local frame 30 is provided in the available workspace in which the mouse or other user object may be moved. In the embodiment described with reference to FIG. 2, for example, the dimensions of the local frame 30 are defined by guide opening 76 in the base 42, which may be approximately 1"×1" or other dimensions. Physical limits to the local frame 30 are provided by guide pin 78 physically impacting a wall of opening 76. The mouse workspace may be defined and limited by other mechanisms or structures in other embodiments.

Display frame 28 is shown as a rectangle overlapping the local frame 30. Display frame 28 is the visible, displayed area on display device 20, such as the displayed portion of a video screen, on which a user controlled graphical object, such as cursor 180, may be moved. In FIG. 5, the display frame 28 is shown as the same size as local frame 30 to emphasize certain concepts in the present invention. However, in actuality, the display frame 28 is typically larger in actual size than the local frame; for example, a computer monitor may have a screen of 15"×11" compared to the local frame dimensions 1"×1". Thus, movement in local frame 30 is scaled up to allow movement across the entire area of display frame 28.

Local frame 30 has a local origin 182 from which x and y coordinates of the mouse device in its workspace are referenced. Cursor 180 is shown in FIG. 5 to represent the position of both the cursor 180 displayed in display frame 28 as well as the current position of the mouse 12 in the local frame 30 (e.g., the position of axis E and guide pin 78 in the embodiment of FIG. 2), where the tip of the cursor indicates the precise position. The guide pin 78 (shown as the tip of cursor 180) thus has a position of (X_local, Y_local) in the example of FIG. 5. Likewise, display frame 28 has a screen origin 184 from which x and y coordinates of the cursor 180 displayed on the screen 20 are referenced. The cursor 180 thus has a position of (X_screen, Y_screen) in the example of FIG. 5.

Border region boundaries 190 and border regions 192 of the present invention are illustrated in FIG. 5. Local frame 30 includes physical limits or edges 194 which represents the physical limits to movement of the mouse 12 in the device workspace. For example, in the embodiment of FIG. 2, limit 194 can be the physical walls to guide opening 76. Boundaries 190 are designated according to software (or the equivalent) by the local microprocessor 130 (or host) to be at some distance d from the limit 194; d can be constant around the limit 194, or d can vary at different sides or portions around the workspace. The shape of the border regions 192 can be different for each side of the workspace, if desired. Border region boundaries 190 define the border region 192 which provides a particular mouse-to-cursor mapping, as described below. The border region 192 borders a device interior region 193 in which a different mouse-to-cursor mapping is provided, as described below. Preferably, the border region 192 is an edge region that is fairly small compared to the size of the screen; for example, width w of the border region 192 can be 5% of total device workspace length or width or a similar dimension.

In FIG. 5, the display frame 28 is shown offset from local frame 30. This can happen when the device workspace is not directly mapped to correspond to the screen pixel dimensions (i.e., when an absolute mapping is not used). This may cause the mouse to hit a workspace limit 194 before the cursor has reached a corresponding edge of the screen. If a standard mouse reaches the edge of its mouse pad, it may be lifted up and re-positioned to reduce or reposition the offset between the frames and allow the mouse more workspace; thus, its workspace is effectively infinite. A force feedback mouse, however, is physically constrained to a fixed-sized workspace as explained above. This workspace typically does not have the same resolution as the screen the cursor moves across, and therefore this offset must be compensated for in other ways. Various methods used to map the physical device workspace to the screen pixels are described below.

Cursor Control in Device Interior Region

The mouse is assumed to be in the device interior region 193 of its workspace most of the time, and this region is where the below-described methods can be applied.

Ballistics

Ballistics define a device-to-screen mapping that is dependent on the velocity that the mouse is currently travelling at in the device workspace. Ballistics helps to provide accurate control of a cursor or other graphical object when the user wishes to coarsely position the cursor, e.g., move the cursor from one object on the screen to another across a large region of the screen. This type of control requires that the cursor be very sensitive to mouse movements so that the cursor will fly rapidly across the screen. Ballistics also helps to provide accurate control of a cursor when the user wishes to finely position the cursor, e.g., to home in on a particular position, such as the interior of a checkbox or the space between two text characters. This type of control requires that the cursor be less sensitive to mouse movements to allow fine motions of the cursor. Often, both methods are combined in a single mouse movement by the user: first the user swings the cursor quickly into a general region and then he or she homes the cursor in on the target, back-tracking to the target if the cursor overshoots the target.

Ballistics tries to provide accurate cursor control for the user in both situations. Just as an automatic transmission sets gear-ratios based on speed, so the ballistics algorithm tries to adjust its workspace-to-screen ratio based on mouse speed. Herein, space in the device workspace is described in units of "tics", where one tic represents the smallest distance (finest resolution) able to be sensed by the sensors of the device 14. For example, when using optical encoders in a preferred embodiment, four tics are sensed when a slot of the encoder wheel or arc passes by the detector assembly (two detectors are provided in quadrature sensing). Other embodiments, such as analog embodiments, can describe mouse workspace in different units or measurements. When the mouse is moved quickly, ballistics assumes that coarse positioning of the cursor is desired, so that a large number of pixels are mapped to a particular number of tics. When the mouse is moved more slowly, ballistics assumes that a finer cursor positioning is desired, so that a smaller number of pixels are mapped to the same number of tics on the device. Embodiments using ballistics in force feedback mice are described in parent patent application Ser. No. 08/924,462, incorporated herein by reference.

In some embodiments, ballistics methods can provide a number of discrete velocity thresholds, where cursor movement is adjusted based on the ballistics relationship associated with the nearest threshold under the current mouse velocity. The local microprocessor 130 or host can check mouse velocity to determine which threshold applies. Alternatively, ballistics methods can use a continuous function to provide cursor movement based on mouse velocity. According to one ballistics method of the present invention, when the mouse is moved slowly (e.g. below a particular velocity threshold), the cursor is moved based on a linear relationship with the amount of tics the mouse is moved. When the mouse is moved quickly (e.g. greater than a particular velocity threshold), the cursor is moved based on an exponential relationship with the amount of tics the mouse is moved.

For example, in one preferred ballistics method, eight distinct threshold relationships are provided, each relationship associated with a different velocity threshold, where three of the relationships are based on a linear relationship with mouse motion and five of the relationships are based on an exponential relationship with mouse motion. An example of the eight thresholds and relationships is provided below:

| Velocity | Formula | Relationship |
|---|---|---|
| 0 | p = c*d*k(v) | p = 4d |
| 1 | p = c*d*k(v) | p = 5d |
| 2 | p = c*d*k(v) | p = 6d |
| 3–4 | p = c*d*(d + k2(v)) | p = dd |
| 5–6 | p = c*d*(d + k2(v)) | p = d(d + 1) |
| 7–8 | p = c*d*(d + k2(v)) | p = d(d + 2) |
| 9–10 | p = c*d*(d + k2(v)) | p = d(d + 3) |
| 11+ | p = c*d*(d + k2(v)) | p = d(d + 4) |

The velocity is shown as ranging from 0 and up, where velocity thresholds are provided at distinct values. These values have been normalized from actual velocity of the manipulandum as determined using position values. For example, the velocity can be calculated as an average of a number of recent velocities, where more recent velocities can be weighted more heavily than older velocities in the determination. Each velocity can be determined using a distance divided by time relationship, where the distance between two tic values is used.

A formula is used to determine each relationship for each threshold. In each formula, p is the number of screen pixels past which the cursor is moved, c is a scaling constant, d is the number of tics through which the mouse has been moved, and k(v) and k2(v) are constants that each increase slightly based on the velocity of the mouse as shown above. The first three velocity thresholds are provided according to the formula p=c*d*k(v), where c is 1 and k(v) is either 4, 5, or 6. Thus, if the mouse velocity is very slow, the first formula will be used; if the mouse is slightly faster, the second formula will be used, and if the mouse is moved faster than that, the third threshold is used. The increasing k(v) term helps to transition smoothly from the use of the first formula to the use of the second formula, described below.

The next five velocity thresholds are determined according to a different formula, p=c*d*(d+k2(v)), where c is 1 and k2(v) increases as shown. The $d^2$ relationship is provided in all five thresholds, thus providing a much greater amount of pixels over which the cursor travels and thus a higher cursor speed.

The ballistics method described above is ideal for force feedback devices (and other interface devices) having limited workspace and hard limits or stops. The second order ($d^2$) relationship provides cursor motion that is greatly scaled in comparison with the corresponding mouse motion, allowing the cursor to move across large areas of the screen with very little mouse motion. In a force feedback mouse having a limited workspace as described above, such an exponential ballistics scaling has been found to provide the user with the essential ability to move the cursor to the edges of the screen while encountering the hard limits to the mouse much less frequently. The second order relationship thus works very well in conserving device workspace when manipulating the cursor. However, when the cursor is desired to be moved slowly, a $1^{st}$ order relationship is used. Another advantage of the described ballistics method is that there are many more ballistics stages than in traditional ballistics methods, which yields smoother transitions between the two ballistics formulas used and diminishes the feel to the user of moving between two movement modes.

Absolute Mapping

In an absolute device-to-screen mapping there is a direct correspondence between the boundaries of the device workspace and the boundaries of the screen. The tics of the device workspace are mapped directly to the screen pixels. For example, the relationship p=c*d can be applied, where p is the number of pixels over which the cursor is moved, c is a scaling constant, and d is the number of tics through which the mouse has been moved. With the correct scaling factor, the dimensions of the workspace in tics can directly correspond to the dimensions of the screen in pixels. If the screen pixel resolution is changed, the scaling factor can be changed to maintain the direct correspondence.

The benefit of this method is that there is no need for any border regions 192 to control cursor movement when the mouse runs out of device workspace (as described below); since with the correct scaling, the device need never run out of workspace and is able to control the cursor to all areas of the screen. Also, since the mapping is consistent, the user can quickly get a sense of how far to move the mouse, whereas in ballistics this is more complicated since speed of the mouse is also a factor. One drawback of this method is that cursor control is not as accurate or convenient as in the ballistics method. At fast speeds, it takes more mouse movement to move the cursor across the span of the screen, while at slow speeds, fine-motion cursor control may be inadequate. Since the workspace resolution (in tics) is generally less than the screen resolution (in pixels), an absolute mapping may cause certain pixels on the screen may be completely inaccessible by the cursor when moved by the mouse. In some embodiments, an absolute mapping can be used for higher mouse speeds, while a different mapping can be used at lower mouse speeds to allow access to all the pixels on the screen, such as the linear mapping described below. Some sort of indexing may have to be used in such an embodiment to re-center the mouse in its workspace, as described below.

The borders of the absolute mapping device interior workspace may be enhanced with other control paradigms. For example, a spring force can be allocated at the limits of the device workspace. When the user moves the mouse against a hard limit of the workspace, a spring force opposes further motion into the hard limit. The spring force cushions the blow when the device engages the edge of the workspace.

Linear Mapping

Linear mapping defines a linear correspondence between the tics moved on the device and the pixels on the screen. For example, a relationship of p=c*d can be used, similar to the absolute method described above. A difference between the linear mapping and the absolute mapping is that, when using the linear mapping, the constant c is not necessarily set to give a direct correspondence between workspace and screen. Therefore, a scaling factor can be set to provide greater cursor motion in response to a given mouse motion, or to provide lesser cursor motion in response to the given mouse motion. A mapping can be defined to provide finer control of the cursor than absolute mode. If fine cursor control is provided, then the mouse may impact the hard limits to the device workspace before the cursor reaches the edge of the screen. Therefore, other border region methods as described below can be used in conjunction with the linear mapping.

Alternatively, other methods can be used for the interior region besides ballistics to vary the scaling or the mapping of the cursor position to allow fine positioning and coarse motion of the cursor. For example, a predictive type of linear mapping (scaling) can be used, which is more "friendly" to force feedback implementations. The predictive scaling only implements a fine-positioning scaling that is different from a coarse-movement scaling when it is deemed necessary for greater control over the cursor, using other criteria besides mouse velocity to determine when to alter the scaling. For example, the local microprocessor (or host) can examine positions of the mouse (or the cursor) over a predetermined period of time to see if a fine positioning mode is entered. The microprocessor checks whether the cursor has moved completely within a small region of predefined size for longer than a predetermined period of time. The region can be defined by a radius or rectangular area surrounding the mouse or cursor; for example, a region having a radius of a specified fraction of screen size can be used. The predetermined period of time is some time period long enough to indicate that the user is attempting to acquire a target or perform some other fine positioning task and may be having some difficulty; for example, 3 seconds can be used, or the time may depend on the particular task. In addition, the cursor should be in motion, since if the cursor is still, then the user may simply have taken his or her hand off the mouse, and fine positioning mode should not be entered.

Cursor Control in Device Border Region

Device border regions 192, as shown in FIG. 5, are the areas near the limits of the device workspace. The border regions are virtual regions in that they are designated in firmware or software and are not physical structures on the device. Thus, the border regions may be adjusted to any size or shape desired. The border regions can be represented as a percentage of the width of the device workspace. For example, a 10% border region size indicates a 5% left-hand border region, a 90% interior width, and a 5% right-hand border region. This percentage number can be similarly applied to top and bottom borders.

The use of ballistics and other variable cursor control methods causes the mouse position in its local frame 30 to become offset from the cursor position in its display frame 28 and may eventually cause the mouse to hit the workspace limits. This is simply caused by the variable scaling of cursor position based on mouse velocity used in ballistics. For example, if a mouse centered in its workspace is moved quickly to the right by 0.5 inches from the center point, the cursor may be moved 8 inches on the screen away from a screen center point. The mouse is then moved back the same 0.5 inches very slowly and is positioned back at the workspace center point. However, the cursor is moved only 1 inch back toward the screen center point due to the ballistics algorithm, creating an offset between the mouse and cursor positions in their respective frames. During more movement, these offsets add up, and the mouse may reach a physical limit to its workspace before the cursor has reached a desired target on the screen. An example of such an offset is shown in FIG. 5 as the distance between the center $C_L$ of the local frame and the center $C_S$ of the screen (display frame). In such an example, the mouse can hit the physical border 196 before the cursor can reach the region 198 on the screen. Offsets in the local and display frames may also occur even when not using ballistics; for example, an application program or operating system may move the cursor independently of the mouse, creating an offset and requiring indexing to reduce or eliminate the offset.

Border regions can be used to reduce the problem of running out of device workspace when the cursor is not yet positioned at a desired location on the screen, such as at the edge of the screen. If border regions were not used, a non-absolute interior region method (such as ballistics or linear mapping) may eventually position the mouse against a physical limit in the device workspace, where the cursor could not be moved any further in the direction the user wishes. When the mouse enters and is positioned in a border region, a mapping method separate and distinct from the interior region mapping is applied to move the cursor on the screen. Ideally, the interior region method should be effective enough so that the mouse is moved to the border regions very infrequently.

Rate Control

As described above, rate control is a mapping in which the displacement of the mouse 12 is abstractly mapped to motion of a computer-simulated object under control, not directly mapped. Thus, the mouse need not be in motion for the cursor to be in motion. In the preferred embodiment, rate control is implemented such that the position of the mouse determines the velocity of the cursor instead of the position of the cursor. Rate control is provided when the mouse is moved from the interior region to a border region. Once the mouse enters the border region, the cursor continues moving toward the closest edge of the screen while the mouse is preferably impeded in the corresponding direction by a resistive force, such as a spring force, damping force, frictional force, etc. A preferred embodiment uses a spring force. For example, moving the mouse into the left border region causes the cursor to continue moving toward the left edge of the screen, while the mouse is impeded in the left direction by a spring force in the right direction (the mouse can preferably be moved to the right freely, and an interior region method can be used immediately upon movement to the right). The cursor moves towards the edge of the screen based on the distance d that the mouse is penetrating into the border region. This distance can be expressed as a ratio r=d/b, where d is the distance of penetration and b is the total width of the border region. A function is then applied to d to achieve the desired cursor velocity v=f(d).

The function f(d) can vary depending on the control scheme. In "dual axis" rate control (see below), the cursor is moved on the screen in two degrees of freedom using the rate control method while the mouse is in the border region. The function applied to d for such a control scheme can be linear, i.e. v=cd where c is a constant scaling factor. In terms of pixels on a screen, the relationship is p=r*c, where p is the number of pixels the cursor is moved since the last displayed position and r is the ratio described above. The velocity of the cursor thus will be linearly based on the distance d penetrated into the border region. This insures that the cursor moves in the direction the user is pushing the mouse. This linear function also works well for "single axis" rate control (see below), where only one mouse direction or degree of freedom uses the rate control method. It is also possible to use a different function that follows a more complicated profile. For example, a function might provide a "deadband" region when the border region is first entered, where the cursor speed does not increase as the penetration into the border region increases. The deadband region would be followed by a region where the cursor movement increases slowly as penetration distance increases. Once the mouse has penetrated halfway into the border region, the velocity of the cursor can increase exponentially in relation to d. Alternatively, a ratio r can be determined based on a minimum width b of the border region, where if b is greater than a particular threshold value, it is assigned that threshold value. This allows the cursor to achieve a maximum velocity after the mouse is moved a desired threshold distance into the border region, regardless of how large b is and without the user having to move the mouse all the way to the edge of the workspace to cause the fastest cursor speed.

As mentioned above, a virtual spring preferably extends across rate control border regions such that a spring force opposes the movement of the mouse into the region. The spring force is strongest at the edge of the device workspace, so that it is most difficult to move the mouse toward a workspace edge when the mouse is close to the edge. The spring is force feedback well-suited for rate control as it creates a correlation that the user can intuitively understand between the pressure the user exerts and the rate of the cursor. If the user eases off of the mouse, the spring will push the mouse out of the boundary. This makes it easy to stop the cursor from moving.

Single Axis Rate Control

Single axis rate control provides a rate control scheme only for one degree of freedom (or direction) of the mouse. The assumption this method makes is that rate control will only be used in the direction in which workspace needs to be conserved, e.g. if the mouse is at a left workspace limit, the mouse still has room to move up, down, and right. Preferably, single axis rate control affects the degree of freedom relevant to the border region. For example, if the mouse enters the left border region, a spring is felt by the user on the left side of the mouse which controls the cursor speed in the left direction on the X-axis according to the rate control method; the left-right degree of freedom on the mouse is the relevant degree of freedom to the border region. However, if the mouse is moved up or down within the border region, the interior region mapping method is used for cursor movement along the Y-axis. Rate control of the cursor is only provided along one axis unless the mouse happens to be in two border regions simultaneously, such as at a corner of the device workspace at the intersection of two border regions, e.g. region 195 in FIG. 5, where rate control can be provided in both degrees of freedom of the mouse.

Dual Axis Rate Control

In contrast to single axis rate control, dual axis rate control (or "radial rate control") affects both axes simultaneously. In other words, when the mouse is moved into a border region, a mode is entered where the cursor position in both the X and Y axes is calculated using a rate control method. In the case where the mouse has entered the left boundary region, rate control and a spring resistance is provided at the left (but not to the right, as described below). In addition, rate control is provided in the forward-back degree of freedom and Y axis. The Y-position of the cursor upon entry to the border region is used as the reference or "zero" point, where there is no Y-axis movement. If the user moves the mouse above this reference point, the cursor will move upwards according to a rate control method. If the user moves the mouse below the reference point, the cursor will move downwards according to the rate control scheme. Rate control mode can be exited by moving the mouse to the right, away from the left border region. Preferably, the user does not also have to return the mouse/cursor to the reference Y-position to exit rate control mode, but such an embodiment can alternatively be implemented.

The assumption this method makes is that rate control is fundamentally different from other position control methods and it is disconcerting to a user to be in rate control in one axis and a different paradigm such as position control in the other axis. Dual axis rate control keeps the mouse in a single mode, either totally in rate control in both degrees of freedom or totally in position control in both degrees of freedom.

The rate control in the degree of freedom of the mouse not relevant to the border region (the "non-relevant degree of freedom" being the degree of freedom not close to an edge of the workspace, e.g., the Y-axis in the above example) can be implemented in different ways. In a preferred embodiment, no forces are provided in the non-relevant degree of freedom. Thus, in the example above, there would be a spring on the left, but no up or down spring. This indicates that the axes are still acting differently since the mouse still has available workspace in one axis but not in the other. In other embodiments, a spring force (or other type of resistive force) can be provided in the non-relevant degree of freedom as well as in the relevant degree of freedom.

Variable Absolute Control

The variable absolute mapping method maps the distance between the cursor and the nearest edge of the screen to the remaining distance between the mouse and the edge of the device workspace (also called the edge-scaling method in parent application Ser. No. 08/924,462). When the mouse reaches the border region, the variable absolute mapping is then applied to provide the proper scaling to the remaining distance to the workspace limit. Thus, if the mouse reaches a workspace limit, the cursor will have always moved fully to the edge of the screen. If the user moves the mouse half of the distance to the workspace edge, the cursor is moved half the distance to the edge of the screen, regardless of how many screen pixels are actually traversed. This guarantees that the cursor will hit the edge the same time the workspace is exhausted. It is similar to absolute mapping or linear mapping in that the mapping is linear, except that the constant multiplying factor is determined when the border region is entered.

Once the mouse enters the border region of the workspace, variable absolute mode is in effect while the cursor is travelling towards the edge of the screen. However, if the mouse is moved away from the closest workspace limit to move the cursor in the opposite direction, device workspace towards the near edge no longer needs to be conserved, and the normal interior range mapping method can be used instead of the variable absolute mapping method, even if the mouse is still located within the border region.

Since variable absolute mapping is a position control mapping, i.e., the device position still corresponds to the cursor position, transition from a position-control interior region to a variable absolute border region has a much less "modal" feel than transition from a position-control interior region into a rate control border, where device position corresponds to velocity.

Variable absolute mapping may cause some problems for the user with fine positioning of the cursor within the edge-scaled region of the screen, since the cursor motion is scaled higher in this region. However, the edge scaling is used only in the direction towards the edge of the screen. Thus, if the user overshoots a target during the edge scaling, the user may move the mouse in the opposite direction to acquire the target, at which point an interior region mapping is used which typically allows easier fine positioning.

In other embodiments, the local microprocessor or host computer can be continually scaling at least one area of the mouse and screen according to the variable absolute mapping method regardless of cursor position and not only when the cursor is in a border region. A new scaling factor can be calculated in real time for all positions of the mouse in its workspace, not just for regions close to the edge of the workspace. For example, the area of the workspace between the mouse and the closest limit can be scaled. The microprocessor would always be examining the distance between the current mouse position and the workspace limit and the distance between the cursor and the screen limits and scaling the cursor position accordingly. In one example, three "cursor speeds" (i.e., cursor scalings) can be provided: coarse, fine, and intermediate. Coarse and fine speeds are constant mappings of cursor to mouse position allowing different degrees of control. However, the intermediate speed can vary the scaling factor according to the offset between local and display frames. In an alternative embodiment, the microprocessor can determine the distance of the mouse and cursor to limits on all sides, such that four different scaling factors can be stored and the one that corresponds to the cursor's actual direction is used.

A damping force can be applied inside variable absolute border regions. The damping force slows the mouse down, cushions impact at the edge of the device workspace, and provides feedback to the user that the mouse is near the edge of the device workspace.

Hybrid Methods

Hybrid mapping methods choose an appropriate mapping method that allows a high velocity of the cursor to be maintained when the cursor moves from an interior region to a border region (or vice versa in alternate embodiments). The mapping method providing the greater cursor speed is selected and its result used for repositioning the cursor. For example, the mouse may be moved in an interior region towards a border region, which moves the cursor toward the edge of the screen. When the mouse is in the border region and moved towards the workspace limit, corresponding pixel offsets according to both the interior region mapping method and the border region mapping method are calculated or otherwise determined (e.g. by the local microprocessor 130 or host). The two pixel offsets are compared and the larger of the two offsets is used to display the cursor at a new location on the screen. This effectively moves the cursor at the fastest rate provided by the two mapping methods. The offsets from both mapping methods can continue to be compared at regular intervals while the mouse is moved within the border region toward the workspace edge, and the fastest offset taken at each interval. Alternatively, the comparison can be made only once when the mouse first enters the border region (or re-enters the border region).

Since border region mapping methods are used to conserve device workspace when the mouse is close to a limit, it makes little sense to transition to a border region method if the border region method actually makes poorer use of remaining device workspace. For example, if an interior region method moves a cursor at a particular velocity, and the border region method actually moves the cursor at a slower velocity, the mouse may hit the workspace limit before the cursor hits the edge of the screen. In most situations, a cursor should not be slowed down when the mouse is about to hit a border region. Hybrid methods most often come into play when the user is moving the mouse quickly using an interior ballistics algorithm.

Figure 6:
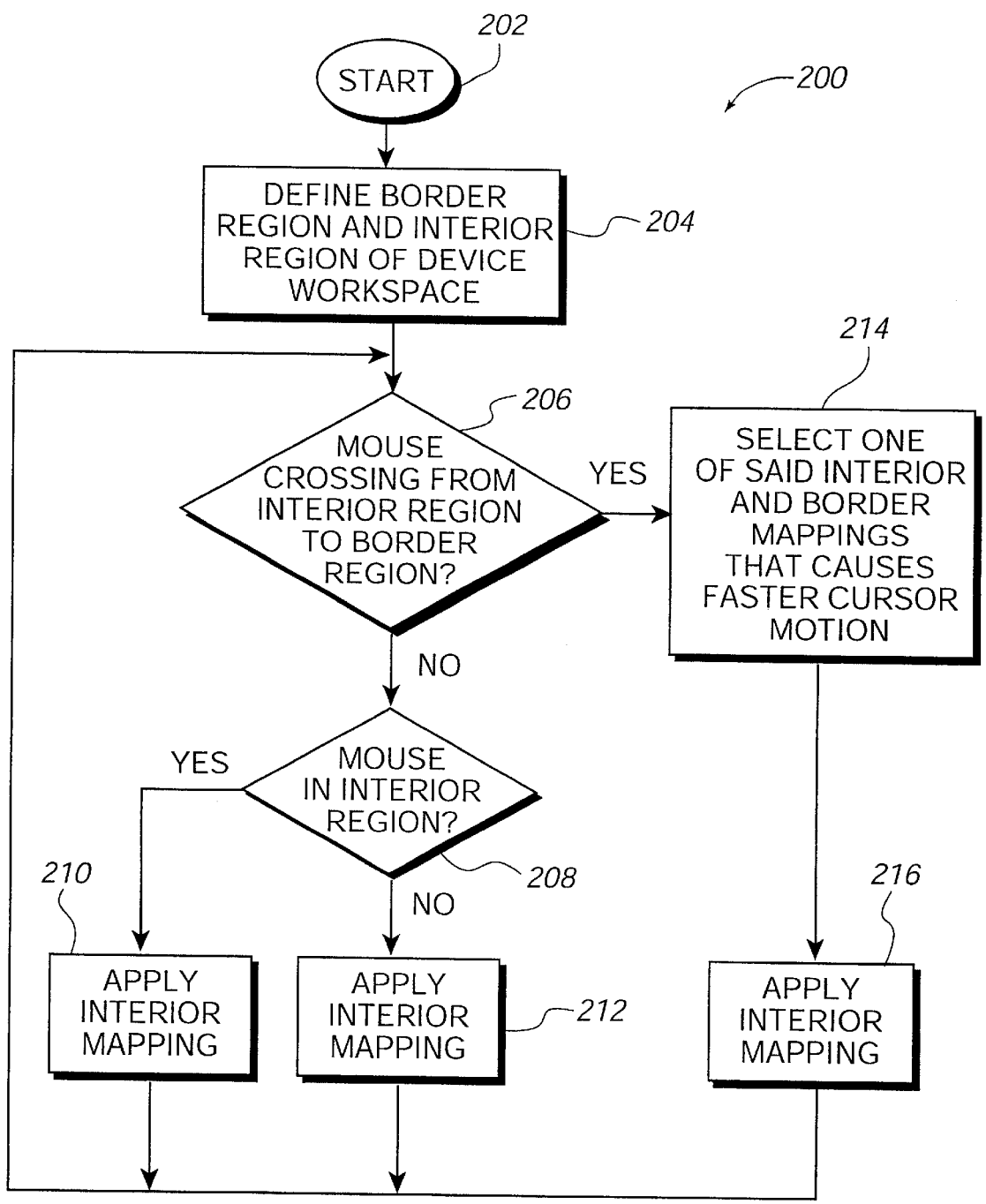
FIG. 6 is a flow diagram illustrating a method of providing a hybrid mapping method of the present invention.

A preferred embodiment of the hybrid mapping method 200 is summarized in the flow diagram of FIG. 6. The method starts at 202, and in step 204, the border region and interior region of the device workspace is defined. This can be defined based on user preferences, or default values. For example, as explained above, a 5% border on each side of the workspace can be defined, with the interior region defined as the remaining area.

In step 206, the process checks whether the mouse (or other manipulandum for a particular device) is crossing from the interior region to the border region. For example, a history of a predetermined number of previous position values of the mouse can be examined to determine if the boundary between regions has been recently crossed. If this is not the case, then the mouse is moving within either the interior region or within the border region (or is moving from the border region to the interior region), and step 208 is initiated. In step 208, the process checks whether the mouse is currently located in the interior region. If so, then in step 210, the process applies an interior mapping, such as a ballistic mapping or other mapping described above. The process then returns to step 206.

If the mouse is not currently in the interior region in step 208, then the mouse must be currently located in the border region, and step 212 is initiated. In step 212, the process applies a border mapping to the control of the cursor. For example, the rate control method described above can be provided in the direction toward the workspace limit to allow rate control over the cursor. The process then returns to step 206.

If in step 206 the mouse is detected to have crossed from the interior region to the border region, then in step 214 the process selects between the interior mapping and the border mapping to control the cursor. The mapping which causes faster cursor motion is the mapping that is selected, as described above. For example, the processor or host can calculate the pixel offset for each of the mappings and choose the mapping providing the greater pixel offset for the cursor. In step 216, the selected mapping is applied to move the cursor on the screen. The process then returns to step 206. It should be noted that, even if the interior mapping is selected to be applied in step 216, any border forces associated with the border mapping are still preferably applied, such as opposing spring forces, to provide consistency. Such opposing forces also tend to cushion the mouse against hitting a hard stop such as the edge of the workspace.

As mentioned above, in alternate embodiments, the selection between mappings can be made each time the mouse is found to be currently located in the border region, rather than only when the mouse first crosses into the border region.

The hybrid method has the effect of making smoother transitions from an interior region method into a border region method. If the user is moving the cursor rapidly, the cursor continues to be moved rapidly after the mouse enters the border region and the user cannot visually detect a difference in mapping regions. While the mouse is in the border region and moving toward the edge, the interior region method offset may fluctuate as the mouse is slowed down and the border region method can take over when it would provide faster cursor movement; and vice versa. In addition, the hybrid method typically has the effect of synchronizing the local and host frames at a faster rate. Thus, if the device workspace limit is reached by the mouse, the cursor is moved as fast as possible to the edge of the screen so that the cursor position at the edge of the screen is synchronized with the mouse position at the edge of the workspace.

Other Embodiments

As explained above and in U.S. Pat. No. 5,825,308 and patent application Ser. No. 08/924,462, both incorporated herein by reference, indexing is used to change the offset between the local frame and the host frame. Indexing with a traditional, unconstrained mouse is accomplished by physically lifting the mouse and moving it to a different location, where input signals are not sent to the host computer while the mouse is moved. A force feedback mouse as described herein typically cannot be physically lifted from its linkage during use, but the temporary severing of the connection between mouse and host computer can be achieved through an alternate input device, such as the depressing of a button on the mouse, the activation of a hand-weight switch in the mouse, or other activation of an input device. When such an input device is pressed, the mouse is virtually "lifted," achieving the same functional indexing mode as lifting a regular mouse.

In some embodiments, the lifting motion of a regular mouse can be approximated or simulated in a grounded force feedback mouse by sensing actual upward (z-axis) motion of the mouse out of its plane of motion when the mouse is lifted by the user. For example, physical play can be allowed in the mouse mechanism along the z-axis, e.g., a hinge, flexure joint, or other mechanism can be provided to allow the mouse to be lifted or pivoted upward by a predetermined amount (before hitting a stop or other limit), or pressure of the mouse in the z-axis can be sensed. A sensor or switch can detect such movement to indicate indexing mode is active. This allows the user to provide indexing with the force feedback mouse using a similar method to that of a traditional, unconstrained mouse. For example, the ground member 42 shown in FIG. 2 can be rotatably coupled to the surface 34 so that the entire mouse assembly can be rotated about axis H, allowing the user to pivot the mouse upwards. Alternatively, just the mouse portion 12 can be allowed to rotate upward with respect to the linkage 40 and other parts of the mechanism.

In some indexing embodiments, a spring force or other centering force can be temporarily applied to the planar degrees of freedom of the mouse using the actuators of the mouse device while indexing mode is active. The centering force guides the mouse to a position in the device workspace which provides a more even distribution of distance from the mouse to the edges of the workspace, thus helping to prevent the mouse from being too close to a workspace limit (an "auto-centering" embodiment). For example, the centering force can guide the mouse to the midpoint between the center of the device workspace and the location in the device workspace where the mouse would be if the mouse were in an absolute mapping mode (as described above) given the current cursor position. In other words, a compromise is made between centering the mouse in the workspace and placing it in a position that relates to the current cursor position. The mouse can be guided to other locations in other embodiments, such as the center of the workspace, or to a predetermined distance from the nearest workspace limit.

Auto centering can also be performed only when the user is not grasping the mouse and/or using the mouse for cursor positioning tasks, since the auto-centering movement might confuse the user. In addition, the auto centering can be performed only when the offset between frames increases over a predetermined threshold. Alternatively, a special button, switch, or other input device can be provided to the user on mouse 12 or other position which would cause the mouse to be auto centered when the input device is selected by the user. An application program can also command an autocentering function to take place using a host command sent to the force feedback device.

No border region methods are theoretically needed if an indexing ability for the force feedback mouse is provided. However, in many practical embodiments, the workspace resolution is small enough such that, apart from absolute mapping mode, border regions are often still desirable.

Software Interface

Many of the features disclosed herein can be presented for a user in a software interface. Since many of the different mapping methods can be varied to provide different cursor movement and since different users may prefer different methods, the user should be presented with an easy way to select between various mapping methods. A software control panel can be used to present various options to the user.

Figure 7:
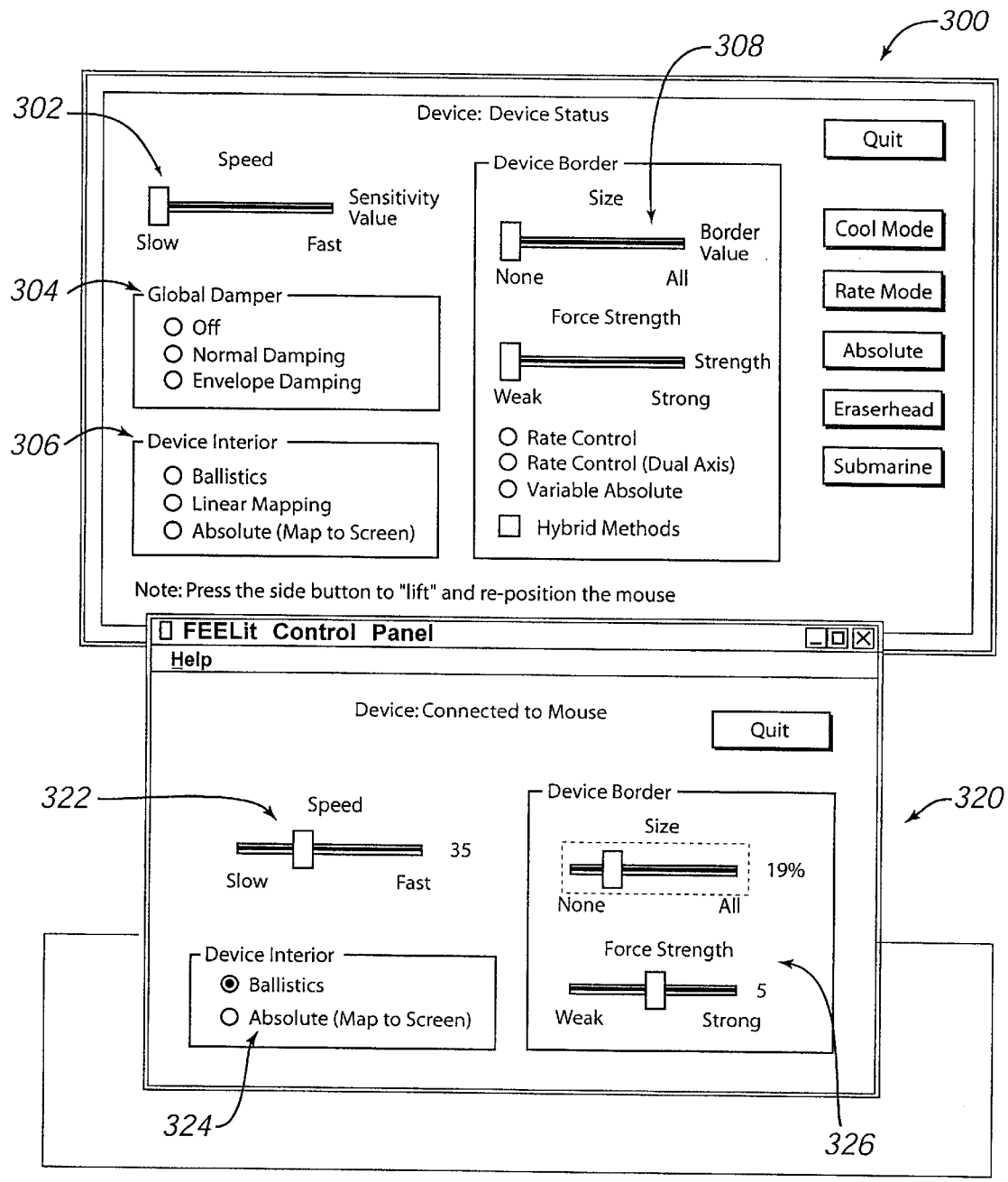
FIG. 7 is an illustration of a displayed interface for selecting features of the present invention.

FIG. 7 illustrates two such software interfaces which allow the user to select between different mapping methods. Interface window 300 can be displayed by an application program or through a system program in a GUI. A user can select a sensitivity value 302 for the mouse-to-cursor mapping, which can adjust the scaling factor of the mapping used. A global damping control 304 can be used to select whether any global damping force is provided. As described in copending patent application Ser. No. 08/924,462, a resistive damping force can be used to slow down the cursor to allow better cursor control. "Normal Damping" can provide a global damping force that increases the damping resistance with the velocity of the mouse. "Envelope damping" can provide a more velocity-dependent damping, e.g. greater damping at slow mouse speeds to provide more accurate control, and less damping at faster mouse speeds to allow easier control over large motions of the cursor. Damping forces can be provided based on other conditions as well, such as velocity thresholds similar to ballistics embodiments.

The Device Interior control 306 allows the user to select the mapping method used for the interior region of the mouse workspace, where ballistics, linear, and absolute mappings are listed. The Device Border control 308 allows the user to select characteristics for the border region. For example, the user can select the size of the border region, which also governs how large the interior region will be. The maximum border region size is the entire screen, such that no interior region is present. The user can also select the strength (magnitude) of force opposing entry into the border region. The user can select single-axis rate control, dual axis rate control, or variable absolute mapping methods for the border region. Finally, the user can select whether hybrid (velocity matching) methods are used upon entry to the border region.

Interface window 320 presents a more simplified interface which presents fewer options to the user, and which may be more suitable for beginning users. The user can adjust basic characteristics such as speed 322 (scaling), device interior region characteristics 324, and device border region characteristics 326. Less options are provided in each selection area.

While this invention has been described in terms of several preferred embodiments, it is contemplated that alterations, permutations and equivalents thereof will become apparent to those skilled in the art upon a reading of the specification and study of the drawings. For example, although examples in a GUI are described, the embodiments herein are also very well suited for other two-dimensional graphical environments and especially three-dimensional graphical environments, where a user would like fine positioning in manipulating 3-D objects and moving in a 3-D space. For example, the rate control regions are quite helpful to move a cursor or controlled object in a 3-D environment further than physical limits of the interface device allow. In addition, many different types of forces can be applied to the user object 12 in accordance with different graphical objects or regions appearing on the computer's display screen and which may be mouse-based force sensations or cursor-based force sensations. Also, the various features of the embodiments herein can be combined in various ways to provide additional embodiments of the present invention. In addition, many types of user objects and mechanisms can be provided to transmit the forces to the user, such as a mouse, trackball, joystick, stylus, or other objects. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A method for providing cursor control on a cursor control interface device, said interface device coupled to a host computer that displays graphical objects in a graphical environment on a display screen, said interface device including a manipulandum movable in a physical workspace in order to control the position of a cursor displayed by said host computer within said graphical environment, the method comprising:

defining a border region and an interior region in said physical workspace of said interface device, said border region being adjacent to at least one limit of said physical workspace;

applying an interior mapping of movement of said manipulandum to movement of said cursor when said manipulandum is positioned in said interior region;

applying a border mapping of movement of said manipulandum to movement of said cursor when said manipulandum is positioned in said border region; and applying a selected one of said interior mapping and said border mapping of movement of said manipulandum to movement of said cursor when said manipulandum crosses from said interior region to said border region, wherein said selected mapping causes a greater velocity of said cursor than the unselected mapping.

2. A method as recited in claim 1 further comprising outputting a force on said manipulandum resisting said penetration into said border region, a magnitude of said force being based on the depth of said penetration into said border region.

3. A method as recited in claim 2 wherein said border mapping is a rate control mapping wherein said penetration into said border region is used to control a speed of movement of said cursor along a particular direction on said display screen.

4. A method as recited in claim 2 wherein said interior mapping is a ballistics mapping, wherein a speed of said cursor depends on a speed of said manipulandum.

5. A method as recited in claim 3 wherein said force resists motion of said mouse only toward said physical limit adjacent to said border region.

6. A method as recited in claim 1 further comprising determining an amount of screen pixels that each of said mappings would cause said cursor to move past, and applying said mapping that causes said cursor to move past the greater number of screen pixels.

7. A method as recited in claim 1 further comprising performing said applying a selected mapping multiple times while said manipulandum is moving in said border region toward said physical limit adjacent to said border region.

8. A force feedback interface device providing cursor control, said interface device coupled to a host computer that displays graphical objects in a graphical environment on a display screen, said interface device comprising:

a manipulandum movable in a physical workspace that controls a position of a cursor displayed by said host computer within said graphical environment, said physical workspace having limits to motion of said manipulandum;

at least one sensor detecting motion of said manipulandum and providing a sensor signal, wherein sensor data based on said sensor signal is provided to said host computer to allow positioning of said cursor;

at least one actuator outputting a force to a user; and a processor receiving said sensor signal and reporting data based on said sensor signal to said host computer to control said position of said cursor, said processor providing signals to said at least one actuator to control an output of said force to said user, said processor defining a border region and an interior region in said physical workspace of said interface device, said border region being adjacent to at least one of said limits of said physical workspace, wherein said processor applies an interior mapping of movement of said manipulandum to movement of said cursor when said manipulandum is positioned in said interior region;

applies a border mapping of movement of said manipulandum to movement of said cursor when said manipulandum is positioned in said border region; and applies a selected one of said interior mapping and said border mapping of movement of said manipulandum to movement of said cursor when said manipulandum crosses from said interior region to said border region, wherein said selected mapping causes a greater velocity of said cursor than the unselected mapping.

9. A force feedback interface device as recited in claim 8 wherein said force output to said user is a resistive force on said manipulandum resisting penetration into said border region from said interior region, a magnitude of said force being based on the depth of said penetration into said border region.

10. A force feedback interface device as recited in claim 9 wherein said border mapping is a rate control mapping wherein said penetration into said border region is used to control a speed of movement of said cursor along a particular direction on said display screen.

11. A force feedback interface device as recited in claim 9 wherein said interior mapping is a ballistics mapping, wherein a speed of said cursor depends on a speed of said manipulandum.

12. A force feedback interface device as recited in claim 10 wherein said force resists motion of said mouse only toward said physical limit adjacent to said border region.

13. A force feedback interface device as recited in claim 8 further comprising determining an amount of screen pixels that each of said mappings would cause said cursor to move past, and applying said mapping that causes said cursor to move past the greater number of screen pixels.

14. A force feedback interface device as recited in claim 8 further comprising a z-axis sensor, wherein said manipulandum is a mouse having two planar degrees of freedom in an x-y workspace, wherein said mouse is coupled to said grounded workspace, and wherein said mouse can be moved approximately in a z-axis for a predetermined distance, said z-axis movement being detected by said z-axis sensor such that when said z-axis movement is detected, said sensor data is not sent to said host computer, allowing indexing of said mouse.

15. A method for providing an indexing feature in a force feedback device, said force feedback device coupled to a host computer that displays a cursor and graphical objects in a graphical environment on a display screen, said force feedback device including a manipulandum being moveable in a local frame, wherein said cursor is moved in a display frame based on said movement of said manipulandum, the method comprising:
  determining whether said manipulandum is within a predetermined distance to a physical limit of said local frame, wherein said predetermined distance is defined by a border region positioned next to said physical limit;
  determining a penetration distance of said manipulandum into said border region;
  using said penetration distance to provide rate control of movement of said cursor toward a screen limit of said display frame corresponding to said physical limit, wherein said cursor is controlled to an edge of said display frame such that said manipulandum need never contact said physical limit of said workspace before said cursor reaches said edge of said display frame; and
  outputting a force on said mouse when said mouse moves into said border region, said force resisting said movement into said border region in at least one direction of said mouse.

16. A method as recited in claim 15 wherein said rate control of movement is only provided when said mouse moves in said border region toward said physical limit next to said border region.

17. A method as recited in claim 15 wherein said force resists motion of said mouse only toward said physical limit next to said border region.

18. A method as recited in claim 15 wherein once said mouse is positioned in said border region, a rate control mapping is provided for control of movement of said cursor in a degree of freedom perpendicular to the degree of freedom including said movement toward said physical limit.

19. A method as recited in claim 15 wherein once said mouse is positioned in said border region, a position control mapping is provided for control of movement of said cursor in a degree of freedom perpendicular to the degree of freedom including said movement toward said physical limit.

20. A method as recited in claim 15 wherein said force is a resistive spring force wherein a magnitude of said force is based on said distance of said mouse past a border of said border region.

21. A method as recited in claim 15 wherein said penetration distance determines a speed of movement of said cursor.

22. A method as recited in claim 15 wherein a size of said border region can be adjusted by a user of said force feedback mouse device.

23. A method as recited in claim 15 wherein said rate control mapping for said border region can be changed by said user, and wherein a mapping used in an interior of said local frame can be selected by said user.

24. A force feedback mouse device providing automatic indexing, said mouse device coupled to a host computer that displays graphical objects in a graphical environment on a display screen, said mouse device comprising:
  a manipulandum movable in two planar degrees of freedom in a local frame, wherein said manipulandum has physical limits to said movement in said local frame;
  at least one position sensor detecting motion of said manipulandum and providing a sensor signal, wherein sensor data based on said sensor signal is provided to said host computer to allow positioning of said cursor in a screen frame;
  a plurality of actuators outputting forces on said user manipulatable object in said two planar degrees of freedom, said forces coordinated with the display of images displayed by said host computer; and
  a processor receiving said sensor signal and reporting data based on said sensor signal to said host computer to control said position of said cursor, said processor providing signals to said actuators to control an output of said forces on said manipulandum in accordance with said display of images and in accordance with force data sent by said host computer, and wherein said processor also controls said forces to move said manipulandum in said local frame to decrease an offset between said local frame and said screen frame.

25. A force feedback mouse device as recited in claim 24 further comprising a contact sensor that determines when said user is contacting said manipulandum, wherein said processor uses said contact sensor to determine when said user contacts said manipulandum, wherein when said user is not contacting said manipulandum, said processor controls said forces to move said manipulandum in said local frame to decrease said offset between said local frame and said screen frame.

26. A force feedback mouse device as recited in claim 24 further comprising a mechanical linkage coupling said manipulandum to a ground surface and allowing said movement of said manipulandum in said two planar degrees of freedom.

27. A force feedback mouse device as recited in claim 24 wherein said processor moves said manipulandum with said forces to a location midway between the center of said local frame and a location in said local frame where said manipulandum would be positioned if the manipulandum were in an absolute mapping mode at said current cursor position.

28. A force feedback mouse device as recited in claim 24 wherein said processor moves said manipulandum with said forces to a location at a predetermined distance from a nearest workspace limit.

29. A force feedback mouse device as recited in claim 24 wherein a program running on said host computer commands said processor to output said forces to decrease said offset between said local frame and said screen frame.

30. A force feedback interface device providing cursor control, said interface device coupled to a host computer that displays graphical objects in a graphical environment on a display screen, said interface device comprising:
  a manipulandum movable in a physical workspace that controls a position of a cursor displayed by said host computer within said graphical environment, said physical workspace having limits to motion of said manipulandum;

at least one sensor that detects motion of said manipulandum and providing a sensor signal, wherein sensor data based on said sensor signal is reported to said host computer to allow positioning of said cursor, wherein a border region and an interior region are defined in said physical workspace of said interface device, said border region being adjacent to at least one of said limits of said physical workspace, and wherein an interior mapping of movement of said manipulandum is applied to movement of said cursor when said manipulandum is positioned in said interior region, a border rate control mapping of movement of said manipulandum is applied to movement of said cursor when said manipulandum is positioned in said border region, and a selected one of said interior mapping and said border mapping of movement of said manipulandum is applied to movement of said cursor when said manipulandum crosses from said interior region to said border region, wherein said selected mapping causes a greater velocity of said cursor than the unselected mapping; and at least one actuator operative to output a force to a user.

31. A force feedback interface device as recited in claim 30 wherein said border rate control mapping uses said penetration into said border region to control a speed of movement of said cursor along a particular direction on said display screen.

32. A force feedback interface device as recited in claim 31 wherein said force output to said user is a resistive force on said manipulandum resisting penetration into said border region from said interior region, a magnitude of said force being based on the depth of said penetration into said border region.

33. A force feedback interface device as recited in claim 30 further comprising a processor that provides signals to said at least one actuator to control an output of said force to said user.

* * * * *

UNITED STATES PATENT AND TRADEMARK OFFICE
CERTIFICATE OF CORRECTION

PATENT NO.   : 6,292,174 B1  Page 1 of 1
DATED        : September 18, 2001
INVENTOR(S)  : Mallett et al.

It is certified that error appears in the above-identified patent and that said Letters Patent is hereby corrected as shown below:

Column 1,
Line 14, before "BACKGROUND OF THE INVENTION", insert -- This invention was made with government support under Contract Number F41624-96-C-6029, awarded by the Department of Defense. The government has certain rights in this invention. --.

Signed and Sealed this

Fourth Day of June, 2002

Attest:

Attesting Officer

JAMES E. ROGAN
Director of the United States Patent and Trademark Office